United States Patent
Zhang

(10) Patent No.: US 12,052,667 B2
(45) Date of Patent: *Jul. 30, 2024

(54) METHOD AND DEVICE FOR POWER ADJUSTMENT IN UE AND BASE STATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 185 days.

This patent is subject to a terminal disclaimer.

(21) Appl. No.: 17/887,517

(22) Filed: Aug. 15, 2022

(65) Prior Publication Data

US 2022/0394623 A1 Dec. 8, 2022

Related U.S. Application Data

(63) Continuation of application No. 16/898,459, filed on Jun. 11, 2020, now Pat. No. 11,463,959, which is a
(Continued)

(30) Foreign Application Priority Data

Dec. 5, 2016 (CN) .......................... 201611106305.6

(51) Int. Cl.
*H04W 52/14* (2009.01)
*H04B 7/0426* (2017.01)
*H04W 52/22* (2009.01)

(52) U.S. Cl.
CPC .......... *H04W 52/14* (2013.01); *H04B 7/0426* (2013.01); *H04W 52/22* (2013.01); *H04W 52/225* (2013.01)

(58) Field of Classification Search
CPC ... H04W 52/14; H04W 52/22; H04W 52/225; H04W 52/146; H04W 52/16;
(Continued)

(56) References Cited

U.S. PATENT DOCUMENTS

2010/0130243 A1* 5/2010 Andersson ............ H04W 52/22
455/522

FOREIGN PATENT DOCUMENTS

| CN | 1296675 A | 5/2001 |
|---|---|---|
| CN | 101669293 A | 3/2010 |
| WO | 2009124078 A | 10/2009 |

OTHER PUBLICATIONS

CN 1st Office Action received in application No. 201611103605.6 dated Sep. 5, 2018.
(Continued)

*Primary Examiner* — Ankur Jain

(57) ABSTRACT

The present disclosure provides a method and a device in a user equipment and a base station used for power adjustment. The UE first receives K downlink signaling(s) and transmits a first radio signal. Any of the K downlink signaling(s) comprises a first field and a second field, the second field of any of the K downlink signaling(s) is used to determine a power offset. A transmitting power of the first radio signal is a first power. A value of each first field of K1 downlink signaling(s) among the K downlink signaling(s) is equal to a first index. The first power is linearly correlated with a sum of K1 power offset(s), which is(are) indicated by each second field of the K1 downlink signaling(s) respectively. The present disclosure can support multiple closed-loop power control processes for one UE so as to improve both efficiency and performance of uplink power control.

20 Claims, 11 Drawing Sheets

Related U.S. Application Data continuation of application No. 16/432,366, filed on Jun. 5, 2019, now Pat. No. 10,743,260, which is a continuation of application No. PCT/CN2017/105188, filed on Oct. 1, 2017.

(58) Field of Classification Search
CPC .............. H04W 52/242; H04W 52/362; H04B 7/0426; H04B 7/043
See application file for complete search history.

(56) References Cited

OTHER PUBLICATIONS

CN Notice of Allowance received in application No. 201611103605.6 dated Oct. 10, 2018.
CN 1st Search Report received in application No. 201611103605.6 dated Aug. 28, 2018.
ISR received in application No. PCT/CN2017/105188 dated Dec. 29, 2017.
CN 1st Office Action received in application No. 201811065235.3 dated Feb. 25, 2020.
CN Notice of Allowance received in application No. 201811065235.3 dated May 7, 2020.
CN 1st Search Report received in application No. 201811065235.3 dated Feb. 6, 2020.
CN 2st Office Action received in application No. 201811065232.X dated Apr. 23, 2020.
CN 1st Office Action received in application No. 201811065232.X dated Feb. 21, 2020.
CN Notice of Allowance received in application No. 201811065232.X Jun. 3, 2020.
CN 1st Search Report received in application No. 201811065232.X Feb. 5, 2020.
ZTE., "3GPPTSG RAN WG 1 Meeting#72 RI-130140", Discussion on Scenarios of 3D Beamforming and Massive MIMO, Feb. 1, 2013 (Feb. 1, 2013). entire document.

\* cited by examiner

METHOD AND DEVICE FOR POWER ADJUSTMENT IN UE AND BASE STATION

CROSS-REFERENCE TO RELATED APPLICATION

This application is a continuation application of the U.S. patent application Ser. No. 16/898,459, filed on Jun. 11, 2020, which is a continuation of the U.S. patent application Ser. No. 16/432,366, filed Jun. 5, 2019, which is a continuation of International Application No. PCT/CN2017/105188, filed Oct. 1, 2017, claiming the priority benefit of Chinese Patent Application Serial Number 20161110630.5, filed on Dec. 5, 2016, the full disclosure of which is incorporated herein by reference.

BACKGROUND

Technical Field

The present disclosure relates to a transmission method and device for supporting power adjustment in a radio communication system, and particularly to a transmission scheme and a device for supporting power adjustment in a radio communication system in which a large number of antennas are deployed on a base station side.

Related Art

Massive Multiple-Input Multiple-Output (MIMO) has become a research hotspot for next-generation mobile communications. In massive MIMO, multiple antennas can improve communication quality by forming narrower beams pointing in a specific direction through beamforming. Since the beam width is very narrow, the transmission paths through which beams pointing in different directions pass are different, which causes a significant difference between long-term channel fading experienced by signals using different beamforming vectors. This difference in long-term channel fading brings new problems to uplink power adjustment.

SUMMARY

Through research, the inventors found that when the base station adopts multi-antenna beamforming based on large-scale MIMO, the adjustment of the uplink power is related to the receiving beamforming vector of the base station, and different receiving beamforming vectors need to correspond to different uplink power adjustment processes, the uplink power offset for a certain receive beamforming vector cannot be used by uplink transmission based on another received beamforming vector. Otherwise, inaccuracy and performance loss may be caused in uplink power adjustment based on another received beamforming vector.

In view of the above problems, the present disclosure provides a solution. It should be noted that, in the case of no conflict, the features in the embodiments and embodiments in user equipment (UE) of the present disclosure can be applied to the base station, and vice versa. The features of the embodiments and the embodiments of the present disclosure may be combined with each other arbitrarily without conflict.

The present disclosure provides a method in a User Equipment (UE) for power adjustment, comprising:
  receiving K downlink signaling(s); and
  transmitting a first radio signal;

wherein any one downlink signaling of the K downlink signaling(s) comprises a first field and a second field; a second field of any one downlink signaling of the K downlink signaling(s) is used to determine a power offset; a transmitting power of the first radio signal is a first power; K1 downlink signaling(s) exists (exist) among the K downlink signaling(s); a value of each first field of the K1 downlink signaling(s) is equal to a first index; a first power is linearly correlated with a sum of K1 power offset(s); the K1 power offset(s) is(are) respectively indicated by each second field of the K1 downlink signaling(s); the K is a positive integer; the K1 is a positive integer not greater than the K; the first index is an integer.

In one embodiment, the advantage of the above method is that a plurality of mutually independent uplink power control processes can be simultaneously supported by a plurality of the first indexes, and power offsets for different power control processes cannot be superimposed on each other. Different first indexes may receive beamforming vectors for different base stations, and the base station may adjust the first power according to channel statistical characteristics of the received beamforming vector corresponding to the first radio signal so that the first power is more relevant to the channel characteristics actually experienced by the first radio signal.

In one embodiment, the K downlink signaling(s) schedules(schedule) the same carrier.

In one embodiment, the unit of the first power is dBm.

In one embodiment, the first power is $P_{PUSCH,c}(i)$, the $P_{PUSCH,c}(i)$ is transmission power of the UE on Physical Uplink Shared Channel (PUSCH) in the i-th subframe of a serving cell with index c, and the first radio signal is transmitted on the serving cell with the index c. The specific definition of $P_{PUSCH,c}(i)$ can be found in TS36.213.

In one embodiment, the first power is $P_{SRS,c}(i)$, the $P_{SRS,c}(i)$ is the transmission power used by the UE to transmit a Sounding Reference Signal (SRS) in the i-th subframe of the serving cell with index c, and the first radio signal is transmitted on the serving cell with the index c. The specific definition of the $P_{SRS,c}(i)$ can be found in TS36.213.

In one embodiment, the first power is linearly related to a first component, and the first component is related to a bandwidth occupied by the first radio signal. A linear coefficient between the first power and the first component is 1.

In a sub-embodiment of the foregoing embodiment, the first component is $10 \log_{10}(M_{PUSCH,c}(i))$, the $M_{PUSCH,c}(i)$ is a bandwidth in a unit of resource block, which is allocated by the PUSCH in the i-th subframe of the serving cell with the index c, and the first radio signal is transmitted on the serving cell with the index c. The specific definition of the $M_{PUSCH,c}(i)$ can be found in TS 36.213.

In one embodiment, the first power and a second component are linearly related, and the second component is related to a scheduling type corresponding to the first radio signal. A linear coefficient between the first power and the second component is 1.

In a sub-embodiment of the foregoing embodiment, the scheduling type comprises a semi-persistent grant, a dynamic scheduled grant, and a random access response grant.

In a sub-embodiment of the foregoing embodiment, the second component is $P_{O\_PUSCH,c}(j)$, the $P_{O\_PUSCH,c}(j)$ is the power offset related to the scheduling type with index j on the serving cell with index c, and the first radio signal is transmitted on the serving cell with index c. The specific definition of $P_{O\_PUSCH,c}(j)$ can be found in TS36.213.

In a sub-embodiment of the foregoing embodiment, the second component is configured by a higher layer signaling.

In a sub-embodiment of the above embodiment, the second component is cell-common.

In one embodiment, the first power and a third component are linearly related, the third component is related to a channel quality between the UE and a receiver of the first radio signal.

In a sub-embodiment of the foregoing embodiment, the linear coefficient between the first power and the third component is a non-negative number less than or equal to 1.

In a sub-embodiment of the foregoing embodiment, the linear coefficient between the first power and the third component is $\alpha_c(j)$, the $\alpha_c(j)$ is a partial path loss compensation factor associated with the scheduling type with index j in the serving cell with index c, the first radio signal being transmitted on the serving cell with index c. The specific definition of $\alpha_c(j)$ can be found in TS36.213.

In a sub-embodiment of the foregoing embodiment, the linear coefficient between the first power and the third component is configured by a higher layer signaling.

In a sub-embodiment of the foregoing embodiment, the linear coefficient between the first power and the third component is cell-common.

In a sub-embodiment of the foregoing embodiment, the third component is $PL_c$, the $PL_c$ is a path loss estimation value of the UE based on a unit of dB in the serving cell with index c, the first radio signal being transmitted on a serving cell with index c. The specific definition of $PL_c$ can be found in TS36.213.

In a sub-embodiment of the foregoing embodiment, the third component is not correlated with a target antenna virtualization vector, and the first index is used to determine the target antenna virtualization vector.

In a sub-embodiment of the foregoing embodiment, the third component is associated with the target antenna virtualization vector, and the first index is used to determine the target antenna virtualization vector.

In a sub-embodiment of the foregoing embodiment, the third component is equal to the transmission power of the given reference signal minus Reference Signal Received Power (RSRP) of the given reference signal.

In a sub-embodiment of the foregoing embodiment, the target antenna virtualization vector is used to receive the given reference signal, and a transmitter of the given reference signal is the UE.

In a sub-embodiment of the foregoing embodiment, the target antenna virtualization vector is used to transmit the given reference signal, and a receiver of the given reference signal is the UE.

In a sub-embodiment of the foregoing embodiment, the antenna virtualization vector for receiving and transmitting the given reference signal is irrelevant with the target antenna virtualization vector.

In one embodiment, the first power and a fourth component are linearly related. The linear coefficient between the first power and the fourth component is 1.

In a sub-embodiment of the foregoing embodiment, the fourth component is related to a Modulation and Coding Scheme (MCS) of the first radio signal.

In a sub-embodiment of the foregoing embodiment, the fourth component is $\Delta_{TF,c}(i)$; the $\Delta_{TF,c}(i)$ is the power offset associated with the MCS of the UE in the i-th subframe of the serving cell with index c; the first radio signal is transmitted on the serving cell with index c. The specific definition of $\Delta_{TF,c}(i)$ can be found in TS36.213.

In a sub-embodiment of the foregoing embodiment, the fourth component is $P_{SRS\_OFFSET,c}(i)$ the $P_{SRS\_OFFSET,c}(i)$ is an offset of the transmit power of the SRS relative to the PUSCH in the i-th subframe of the serving cell with index c, and the first radio signal is transmitted on the serving cell with index c. The specific definition of $P_{SRS\_OFFSET,c}(i)$ can be found in TS36.213.

In a sub-embodiment of the foregoing embodiment, the fourth component is configured by a higher layer signaling.

In a sub-embodiment of the foregoing embodiment, the fourth component is the cell-common.

In one embodiment, the first power and a fifth component are linearly related, and the K1 power offset(s) is(are) used to determine the fifth component. The linear coefficient between the first power and the fifth component is 1.

In a sub-embodiment of the foregoing embodiment, the power offset is indicated by Transmitter Power Control (TPC).

In a sub-embodiment of the foregoing embodiment, the sum of the fifth component and the K1 power offset(s) is linearly related, and the linear coefficient between the fifth component and the sum of the K1 power offset(s) is 1.

In a sub-embodiment of the foregoing embodiment, the fifth component is $f_c(i)$, the $f_c(i)$ is a state of power control adjustment on the PUSCH in the i-th subframe in the serving cell with index c, and the first radio signal is transmitted on the serving cell with index c. The specific definition of $f_c(i)$ can be found in TS36.213.

In one embodiment, the first power is equal to $P_{CMAX,c}(i)$, the $P_{CMAX,c}(i)$ is a highest transmit power threshold configured by the UE in the i-th subframe of the serving cell with index c, and the first radio signal is transmitted on the serving cell with index c. The specific definition of $P_{CMAX,c}(i)$ can be found in TS36.213.

In one embodiment, the first power is less than $P_{CMAX,c}(i)$.

In one embodiment, the first field comprises 2 bits.

In one embodiment, the first field comprises 3 bits.

In one embodiment, the first field comprises 4 bits.

In one embodiment, the first index is a non-negative integer.

In one embodiment, the second field is a TPC.

In one embodiment, the sum of the K1 power offset(s) is used to determine $f_c(i)$.

In one embodiment, the time domain resources occupied by any two of the K downlink signalings are orthogonal (i.e., do not overlap each other).

In one embodiment, the first power is irrelevant to a second field in a given downlink signaling, the given downlink signaling is any downlink signaling whose first field value is not equal to the first index among the K downlink signaling(s).

In one embodiment, the K downlink signaling(s) is(are) all dynamic signaling(s).

In one embodiment, the K downlink signaling(s) is(are) dynamic signaling(s) for Uplink Grant.

In one embodiment, a linear coefficient between the first power and the sum of the K1 power offset(s) is 1.

In one embodiment, the first radio signal comprises the SRS.

In one embodiment, the first radio signal is transmitted on a physical layer data channel.

In a sub-embodiment of the foregoing embodiment, the physical layer data channel is a PUSCH.

In a sub-embodiment of the foregoing embodiment, the physical layer data channel is a short PUSCH (sPUSCH).

In one embodiment, the K downlink signaling(s) is(are) transmitted on a downlink physical layer control channel (i.e., a downlink channel that can only be used to carry physical layer signaling).

In a sub-embodiment of the foregoing embodiment, the downlink physical layer control channel is a Physical Downlink Control Channel (PDCCH).

In a sub-embodiment of the foregoing embodiment, the downlink physical layer control channel is a short PDCCH (sPDCCH).

Specifically, according to an aspect of the present disclosure, a first signaling is a last downlink signaling received among the K downlink signaling(s); the first signaling comprises scheduling information of the first radio signal, the scheduling information comprises at least one of time domain resources occupied, frequency domain resources occupied, an MCS, a Hybrid Automatic Repeat reQuest (HARD) Process Number, a Redundancy Version (RV), or a New Data Indicator (NDI).

Specifically, according to an aspect of the present disclosure, the first radio signal comprises a first reference signal; the first index is used to determine an RS sequence corresponding to the first reference signal; or a first bit block is used to generate the first radio signal; the first index is used to generate a scrambling sequence corresponding to the first bit block.

In one embodiment, the first radio signal is obtained after the first bit block is sequentially subjected to scrambling, a modulation mapper, a layer mapper, a transform precoder, precoding, an RE mapper and multi-carrier symbol generator.

In a sub-embodiment of the foregoing embodiment, the multi-carrier symbol is an Orthogonal Frequency Division Multiplexing (OFDM) symbol.

In a sub-embodiment of the foregoing embodiment, the multi-carrier symbol is a Single-Carrier Frequency Division Multiple Access (SC-FDMA) symbol.

In a sub-embodiment of the foregoing embodiment, the multi-carrier symbol is a Filter Bank Multi Carrier (FBMC) symbol.

In one embodiment, a sequence-shift pattern for generating the RS sequence corresponding to the first reference signal is $f_{ss}^{PUSCH}=(N_{ID}^{cell}+\Delta_{ss}+\Delta_1) \bmod 30$; the $f_{ss}^{PUSCH}$ is a sequence shift pattern on the PUSCH; the $N_{ID}^{cell}$ is an identifier of the serving cell; the $\Delta_{ss}$ is a sequence shift offset configured by the higher layer signaling; the $\Delta_1$ represents the first index. The specific definitions of the $f_{ss}^{PUSCH}$, the $N_{ID}^{cell}$, and the $\Delta_{ss}$ can be found in TS36.211.

In one embodiment, an initialization value of a generator of the scrambling sequence corresponding to the first bit block is related to the first index.

In a sub-embodiment of the foregoing embodiment, the initialization value of the generator of the scrambling sequence corresponding to the first bit block is $c_{init}=n_{RNTI} \cdot 2^{14}+q \cdot 2^{13}+\lfloor n_s/2 \rfloor \cdot 2^9+(N_{ID}^{cell}+\Delta_1) \bmod 512$; the $c_{init}$ is an initialization value of a generator of the scrambling sequence corresponding to the first bit block the $n_{RNTI}$ is an identifier in the radio network, the q is an index of a codeword corresponding to the first bit block, and the $n_s$ is an index of a time slot in a radio frame, the $N_{ID}^{cell}$ is the identity of the serving cell, the $\Delta_1$ represents the first index. The specific definition of the $c_{init}$, the $n_{RNTI}$, the q, the $n_s$ and the $N_{ID}^{cell}$ can be found in TS36.211.

In one embodiment, the first index is a non-negative integer.

In one embodiment, the first reference signal is the SRS.

In one embodiment, the first reference signal is used for uplink monitoring.

In one embodiment, the first radio signal comprises only the first reference signal.

In one embodiment, the first radio signal further comprises at least one of uplink data and uplink control information.

In one embodiment, the first reference signal is a DeModulationRS (DMRS).

Specifically, according to an aspect of the present disclosure, the first index is an index of the target antenna virtualization vector in Q antenna virtualization vectors; the target antenna virtualization vector is used to receive the first radio signal.

In one embodiment, the advantage of the foregoing method is that the mutually independent power control can be performed on the uplink transmissions received with different antenna virtualization vectors by using the first index so that each power control process directly targets the corresponding the channel characteristics under the antenna virtualization vector to improve the efficiency and performance of power control.

In one embodiment, the receiver of the first radio signal performs analog beamforming with the target antenna virtualization vector to receive the first radio signal.

In one embodiment, the receiver of the first radio signal performs beamforming with the target antenna virtualization vector to receive the first radio signal.

Specifically, according to an aspect of the present disclosure, the first index is used to determine (a) transmission antenna ports(port) of the first radio signal.

In one embodiment, the transmission antenna ports(port) of the first radio signal is(are) formed by superimposing of multiple antennas through antenna virtualization, and the mapping coefficients of the multiple antennas to the transmission antenna ports(port) constitute a beamforming vector.

In one embodiment, the advantage of the above method is that the first index can be used not only to distinguish different receiving beamforming vectors, but also to distinguish different transmitting beamforming vectors, so that the corresponding power control is more targeted.

Specifically, according to an aspect of the present disclosure, the method further comprises:
  receiving Q radio signals;
    wherein the Q radio signals are transmitted by Q antenna port sets respectively; the antenna port set comprises a positive integer number of antenna port(s); the first index is an integer less than the Q and not less than 0.

In one embodiment, the advantage of the foregoing method is that, on the premise of the uplink and downlink channels have reciprocity, the UE is allowed to perform uplink channel estimation by measuring the Q radio signals of downlink transmitting to reduce the complexity and overhead of the uplink channel estimation.

In one embodiment, the antenna port(s) is(are) formed by superimposing of a plurality of antennas through antenna virtualization, and mapping coefficients of the plurality of antennas to the antenna port(s) constitute a beamforming vector. The beamforming vector is composed of an analog beamforming vector and a Kronecker product of a digital beamforming vector.

In a sub-embodiment of the foregoing embodiment, different antenna ports in one antenna port set correspond to one same analog beamforming vector, and the Q antenna virtualization vectors are the analog beamforming vectors corresponding to the Q antenna port sets, respectively.

In a sub-embodiment of the foregoing embodiment, different antenna ports in one antenna port set correspond to different digital beamforming vectors.

In one embodiment, each of the Q antenna port sets comprises only one antenna port, and the Q antenna virtualization vectors are the beamforming vectors corresponding to the Q antenna port groups, respectively.

In one embodiment, a target radio signal is one of the Q radio signals, the target radio signal has the best receiving quality among the Q radio signals, and the target radio signal is transmitted on a target antenna port set, an index of the target antenna port set in the Q antenna port sets is the first index.

In a sub-embodiment of the foregoing embodiment, the receiving quality comprises one or two of the RSRP and Reference Signal Received Quality (RSRQ).

In one embodiment, the Q radio signals include one or more of Primary Synchronization Signal (PSS), Secondary Synchronization Signal (SSS), Master Information Block (MIB)/System Information Block (SIB), and Channel State Information Reference Signal (CSI-RS).

In one embodiment, the Q radio signals are further used to determine a first channel quality, and the first power is linearly related to the first channel quality.

In a sub-embodiment of the foregoing embodiment, the first channel quality is an average value of Q first sub-channel qualities, and the Q first sub-channel qualities are respectively determined by measurement of the Q radio signals. Any one of the Q first sub-channel qualities is equal to a transmitting power of the corresponding radio signal minus the RSRP of the corresponding radio signal.

In a sub-embodiment of the foregoing embodiment, the first channel quality is one of the Q first sub-channel qualities, and an index of the radio signal among the Q radio signals corresponding to the first channel quality is the first index.

In a sub-embodiment of the foregoing embodiment, the linear coefficient between the first power and the first channel quality is a non-negative number less than or equal to 1.

In a sub-embodiment of the foregoing embodiment, a linear coefficient between the first power and the first channel quality is $\alpha_c(j)$.

In a sub-embodiment of the foregoing embodiment, the linear coefficient between the first power and the first channel quality is configured by a higher layer signaling.

In a sub-embodiment of the foregoing embodiment, the linear coefficient between the first power and the first channel quality is the cell-common.

Specifically, according to an aspect of the present disclosure, the method further comprises:
  transmitting Q reference signals in Q time windows respectively;
  wherein any two of the Q time windows are orthogonal; the first index is an integer less than the Q and not less than 0.

In one embodiment, the foregoing method is advantageous in that, on the premise that the uplink and downlink channels are not reciprocal, the UE is supported to transmit the Q reference signals so as to assist the base station in performing uplink channel estimation.

In one embodiment, the Q reference signals correspond to one same transmission antenna port.

In a sub-embodiment of the foregoing embodiment, a transmission antenna port corresponding to the Q reference signals is used to transmit the first radio signal.

In one embodiment, the Q reference signals include one or more of Random Access Channel (RACH) Preamble, the SRS, and the DMRS.

In one embodiment, the Q antenna virtualization vectors are respectively used to receive the Q reference signals.

In a sub-embodiment of the foregoing embodiment, the target reference signal is one of the Q reference signals, the target reference signal has the best receiving quality among the Q reference signals, and the target antenna virtualization vector is used for receiving the target reference signal; an index of the target antenna virtualization vector in the Q antenna virtualization vectors is the first index.

In a sub-embodiment of the foregoing sub-embodiment, the receiving quality comprises one or both of the RSRP and the RSRQ.

In one embodiment, the Q reference signals are also used to determine a second channel quality, the first power is linearly related to the second channel quality.

In a sub-embodiment of the foregoing embodiment, the second channel quality is an average value of Q second sub-channel qualities, and the Q second sub-channel qualities are respectively determined by measurement of the Q reference signals. Any one of the Q second sub-channel qualities is equal to a transmit power of the corresponding reference signal minus the RSRP of the corresponding reference signal.

In a sub-embodiment of the foregoing embodiment, the second channel quality is one of the Q second sub-channel qualities, and an index of the reference signal among the Q reference signals corresponding to the second channel quality is the first index.

In a sub-embodiment of the foregoing embodiment, the linear coefficient between the first power and the second channel quality is a non-negative number less than or equal to 1.

In a sub-embodiment of the above embodiment, a linear coefficient between the first power and the second channel quality is $\alpha_c(j)$.

In a sub-embodiment of the foregoing embodiment, the linear coefficient between the first power and the second channel quality is configured by the higher layer signaling.

In a sub-embodiment of the foregoing embodiment, the linear coefficient between the first power and the second channel quality is the cell-common.

Specifically, according to an aspect of the present disclosure, the method further comprises:
  transmitting a second radio signal;
  wherein the second radio signal indicates Q1 antenna port set(s) of the Q antenna port sets; the Q1 antenna port set(s) comprises(comprise) a target antenna port set; an index of the target antenna port set among the Q antenna port sets is the first index; the Q1 is a positive integer not greater than the Q.

Specifically, according to an aspect of the present disclosure, each of the Q reference signals has a density in frequency domain that is smaller than a density of the first reference signal in frequency domain.

In one embodiment, the density on the frequency domain refers to the number of subcarriers occupied in a unit frequency domain resource.

In a sub-embodiment of the foregoing embodiment, the unit frequency domain resource is a Physical Resource Block (PRB).

In a sub-embodiment of the foregoing embodiment, the unit frequency domain resource comprises a positive integer number of consecutive subcarrier(s).

In one embodiment, the Q reference signals are wideband.

In a sub-embodiment of the foregoing embodiment, the system bandwidth is divided into positive integer frequency domain region(s), and the Q reference signals appear in all frequency domain regions within the system bandwidth; the bandwidth corresponding to each frequency domain region among the positive integer frequency domain regions is equal to the difference between frequencies of two adjacent frequency units occurred of any one of the Q reference signals.

In one embodiment, the first reference signal is wideband.

In one embodiment, the first reference signal is narrowband.

In a sub-embodiment of the foregoing embodiment, the system bandwidth is divided into positive integer number of frequency domain region(s), and the first reference signal appears only in part of the positive integer number of frequency domain region(s).

The present disclosure discloses a method for power adjustment in a base station, comprises:
  transmitting K downlink signaling(s);
  receiving a first radio signal;
    wherein any downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exist(s) among the K downlink signaling(s); a value of each first field of the K1 downlink signaling(s) is equal to a first index; the first power is linearly correlated with K1 power offset(s), the K1 power offset(s) is(are) indicated by each second field of the K1 downlink signaling(s) respectively; the K is a positive integer, the K1 is a positive integer not greater than the K; the first index is an integer.

In one embodiment, the K downlink signaling(s) schedules(schedule) one same carrier.

In one embodiment, the time domain resources occupied by any two downlink signalings of the K downlink signalings are orthogonal (i.e., do not overlap each other):

In one embodiment, the first power is not related to the second field of a given downlink signaling, the given downlink signaling is any downlink signaling whose first field value is not equal to the first index among the K downlink signaling(s).

In one embodiment, a linear coefficient between the first power and the sum of the K1 power offset(s) is 1.

Specifically, according to an aspect of the present disclosure, a first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

Specifically, according to an aspect of the present disclosure, the first radio signal comprises a first reference signal, the first index is used to determine an RS sequence corresponding to the first reference signal; or a first bit block is used to generate the first radio signal, the first index is used to generate a scrambling sequence corresponding to the first bit block.

In one embodiment, the first index is a non-negative integer.

In one embodiment, the first radio signal comprises only the first reference signal.

In one embodiment, the first radio signal further comprises at least one of uplink data, and uplink control information.

Specifically, according to an aspect of the present disclosure, the first index is an index of the target antenna virtualization vector in Q antenna virtualization vectors; the target antenna virtualization vector is used to receive the first radio signal.

Specifically, according to an aspect of the present disclosure, the first index is used to determine the transmission antenna ports(port) of the first radio signal.

Specifically, according to an aspect of the present disclosure, the method further comprises:
  transmitting Q radio signals;
  wherein the Q radio signals are transmitted by Q antenna port sets respectively; the antenna port set comprises a positive integer number of antenna port(s); the first index is an integer less than the Q and not less than 0.

Specifically, according to an aspect of the present disclosure, the method further comprises:
  receiving Q reference signals in Q time windows respectively;
  wherein any two of the Q time windows are orthogonal, the first index is an integer less than the Q and not less than 0.

In one embodiment, the Q reference signals correspond to the same transmission antenna port.

Specifically, according to an aspect of the present disclosure, further comprises:
  receiving a second radio signal;
  wherein the second radio signal indicates Q1 antenna port set(s) of the Q antenna port sets, the Q1 antenna port set(s) comprises(comprise) a target antenna port set, an index of the target antenna port set among the Q antenna port sets is the first index, the Q1 is a positive integer not greater than the Q.

Specifically, according to an aspect of the present disclosure, a density of each of the Q reference signals on frequency domain is smaller than a density of the first reference signal in the frequency domain.

The disclosure discloses a user equipment used for power adjustment, comprising:
  a first processor, receiving K downlink signaling(s); and
  a first transmitter, transmitting a first radio signal;
    wherein any one downlink signaling of the K downlink signaling(s) comprises a first field and a second field; the second field of any downlink signaling of the K downlink signaling(s) is used to determine a power offset; a transmitting power of the first radio signal is a first power; K1 downlink signaling(s) exist(s) among the K downlink signaling(s); a value of each first field of the K1 downlink signaling(s) is equal to a first index; the first power is linearly correlated with a sum of K1 power offset(s); the K1 power offset(s) is(are) respectively indicated by each second field of the K1 downlink signaling(s); the K is a positive integer, the K1 is a positive integer not greater than the K; the first index is an integer.

In one embodiment, the K downlink signaling(s) schedules(schedule) the same carrier.

In one embodiment, the first power is not related to the second field of a given downlink signaling, the given downlink signaling is any downlink signaling whose first field value is not equal to the first index among the K downlink signaling(s). In one embodiment, first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

In one embodiment, the first radio signal comprises a first reference signal, the first index is used to determine an RS sequence corresponding to the first reference signal; or a first bit block is used to generate the first radio signal, the first index is used to generate a scrambling sequence corresponding to the first bit block.

In one embodiment, the first index is an index of the target antenna virtualization vector in the Q antenna virtualization vectors; the target antenna virtualization vector is used to receive the first radio signal.

In one embodiment, the first index is used to determine the transmission antenna ports(port) of the first radio signal.

In one embodiment, the first processor is further configured to receive Q radio signals. The Q radio signals are respectively transmitted by Q antenna port sets, and the antenna port set comprises a positive integer number of antenna port(s). The first index is an integer smaller than the Q and not less than 0.

In one embodiment, the first processor is further configured to transmit Q reference signals in Q time windows respectively. Wherein any two of the Q time windows are orthogonal, the first index is an integer less than the Q and not less than 0.

In one embodiment, the first processor is further configured to transmit a second radio signal; wherein the second radio signal indicates Q1 antenna port set(s) of the Q antenna port sets, the Q1 antenna port set(s) comprises(comprise) a target antenna port set, an index of the target antenna port set among the Q antenna port set(s) is the first index, and the Q1 is a positive integer not greater than the Q.

In one embodiment, the density of each of the Q reference signals on frequency domain is smaller than a density of the first reference signal in the frequency domain.

The present disclosure discloses a base station device for power adjustment, comprises:
- a second processor, transmitting K downlink signaling(s);
- a first receiver, receiving a first radio signal;
- wherein, any one downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exist(s) among the K downlink signaling(s), a value of each first field of the K1 downlink signaling(s) is equal to a first index; the first power is linearly correlated with a sum of K1 power offset(s), the K1 power offset(s) is(are) respectively indicated by each second field of the K1 downlink signaling(s); the K is a positive integer, the K1 is a positive integer not greater than the K; the first index is an integer.

In one embodiment, the K downlink signaling(s) schedules(schedule) a same carrier.

In one embodiment, the first power is not related to the second field of a given downlink signaling, the given downlink signaling is any downlink signaling whose first field value is not equal to the first index among the K downlink signaling(s).

In one embodiment, the first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

In one embodiment, the first radio signal comprises a first reference signal; the first index is used to determine an RS sequence corresponding to the first reference signal; or a first bit block is used to generate the first radio signal; the first index is used to generate a scrambling sequence corresponding to the first bit block.

In one embodiment, the first index is an index of the target antenna virtualization vector in the Q antenna virtualization vectors; the target antenna virtualization vector is used to receive the first radio signal.

In one embodiment, the first index is used to determine the transmission antenna ports(port) of the first radio signal.

In one embodiment, the second processor is further configured to transmit Q radio signals. The Q radio signals are transmitted by Q antenna port sets respectively, the antenna port set comprises a positive integer number of antenna port(s), and the first index is an integer less than the Q and not less than 0.

In one embodiment, the second processor is further configured to receive Q reference signals in Q time windows respectively, wherein any two of the Q time windows are orthogonal; the first index is an integer less than the Q and not less than 0.

In one embodiment, the second processor is further configured to receive a second radio signal. The second radio signal indicates a Q1 antenna port set(s) of the Q antenna port sets; the Q1 antenna port set(s) comprises(comprise) a target antenna port set; an index of the target antenna port set among the Q antenna port set(s) is the first index; the Q1 is a positive integer not greater than the Q.

In one embodiment, a density of each of the Q reference signals on a frequency domain is smaller than a density of the first reference signal in frequency domain Compared with traditional schemes, the present disclosure has the following advantages:

Multiple mutually independent uplink power control processes may be supported at the same time, and the power offsets for different power control processes cannot be superimposed on each other.

Different power control processes are for different receiving beamforming vectors and transmitting beamforming vectors. Due to distinction of the channel long time fading caused by adopting different receiving beamforming vectors and transmitting beamforming vectors, each power control process can adjust the uplink power according to the actual channel statistical characteristics, so that the uplink power control is more suitable for the characteristics of channel actually experienced by uplink transmission, thus improving the efficiency and performance of uplink power control.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

Embodiment 1

Figure 1:
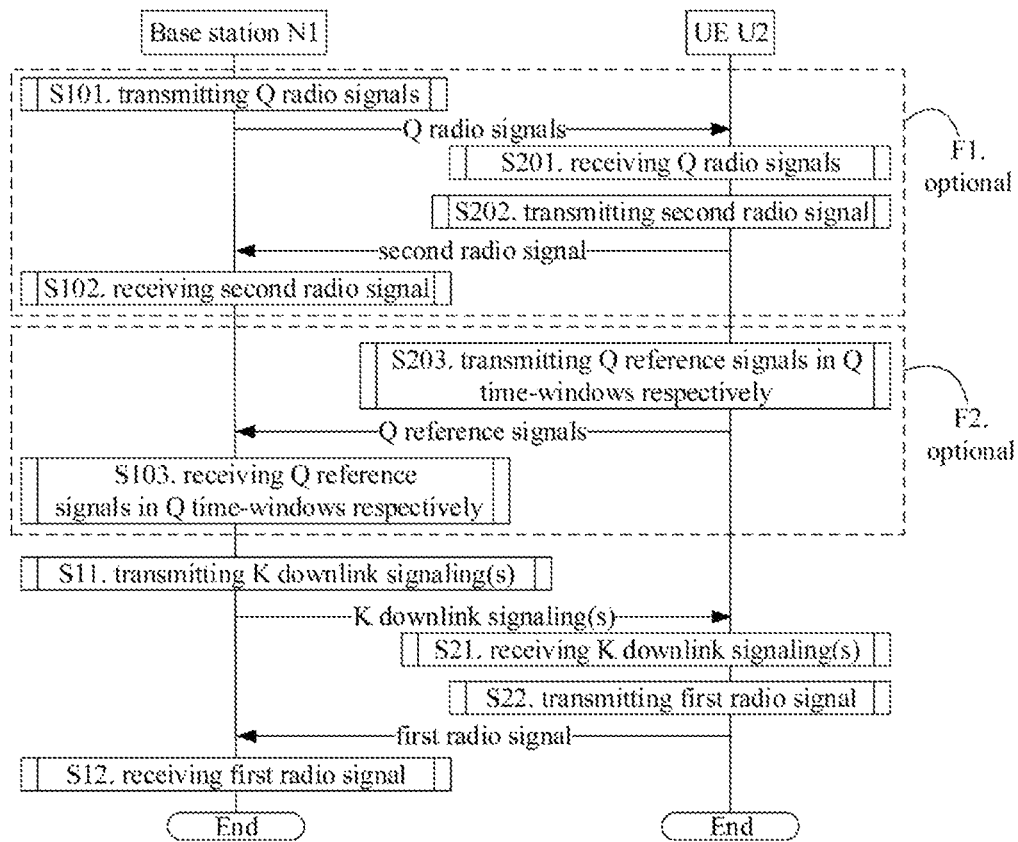
FIG. 1 shows a flowchart of radio transmission according to one embodiment of the present disclosure.

Embodiment 1 illustrates a flow chart of radio transmission, as shown in FIG. 1. In FIG. 1, the base station N1 is a maintenance base station of the serving cell of the user equipment (UE) U2. In the figure, the step in the boxes F1 and F2 are optional, respectively. The step in the boxes F1 and F2 cannot exist simultaneously.

The base station N1 transmits Q radio signals in step S101; receives the second radio signal in step S102; receives Q reference signals in Q time windows respectively in step S103; transmits K downlink signaling(s) in step S11; and receives the first radio signal in step S12.

The UE U2 receives Q radio signal in step S201; transmits the second radio signal in step S202; transmits Q reference signals in Q time windows respectively in step S203; receives K downlink signaling(s) in step S21; and transmits the first radio signal in step S22.

In Embodiment 1, any one downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exist(s) among the K downlink signaling(s), a value of each first field of the K1 downlink signaling(s) is equal to a first index; the first power is linearly correlated with a sum of K1 power offset(s), the K1 power offset(s) is(are) respectively indicated by each second field of the K1 downlink signaling(s); the K is a positive integer, the K1 is a positive integer not greater than the K; the first index is an integer. The Q radio signals are transmitted by Q antenna port sets respectively; the antenna port set comprises a positive integer number of antenna port(s). The Q reference signals are respectively separated in Q time windows. Any two of the Q time windows are orthogonal. The first index is an integer less than the Q and not less than 0. The second radio signal indicates Q1 antenna port set(s) in the Q antenna port sets, the Q1 antenna port set(s) comprises(comprise) a target antenna port set, an index of the target antenna port set among the Q antenna port sets is the first index, the Q1 is a positive integer not greater than the Q.

In one embodiment, the K downlink signaling(s) schedules(schedule) the same carrier.

In one embodiment, the first field comprises 2 bits.

In one embodiment, the first field comprises 3 bits.

In one embodiment, the first field comprises 4 bits.

In one embodiment, the first index is a non-negative integer.

In one embodiment, the second field is TPC.

In one embodiment, the time domain resources occupied by any two downlink signalings of the K downlink signalings are orthogonal (i.e., do not overlap each other).

In one embodiment, the first power is not related to the second field of a given downlink signaling, the given downlink signaling is any downlink signaling whose first field value is not equal to the first index among the K downlink signaling(s).

In sub-embodiment 9 of Embodiment 1, the K downlink signaling(s) is(are) dynamic signaling.

In one embodiment, the a first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

In one embodiment, the first radio signal comprises a first reference signal, the first index is used to determine an RS sequence corresponding to the first reference signal; or a first bit block is used to generate the first radio signal, the first index is used to generate a scrambling sequence corresponding to the first bit block.

In a sub-embodiment of the foregoing embodiment, the first reference signal is the SRS.

In a sub-embodiment of the foregoing embodiment, the first reference signal is used for uplink monitoring.

In a sub-embodiment of the foregoing embodiment, the first reference signal is DMRS.

In one embodiment, the first radio signal comprises only the first reference signal.

In one embodiment, the first radio signal further comprises at least one of uplink data and uplink control information.

In one embodiment, the first index is an index of the target antenna virtualization vector in the Q antenna virtualization vectors; the target antenna virtualization vector is used to receive the first radio signal.

In one embodiment, the first index is used to determine a transmitting antenna port of the first radio signal.

In one embodiment, the Q reference signals correspond to one same transmitting antenna port.

In one embodiment, a density of each of the Q reference signals in frequency domain is less than a density of the first reference signal in frequency domain.

Embodiment 2

Figure 2:
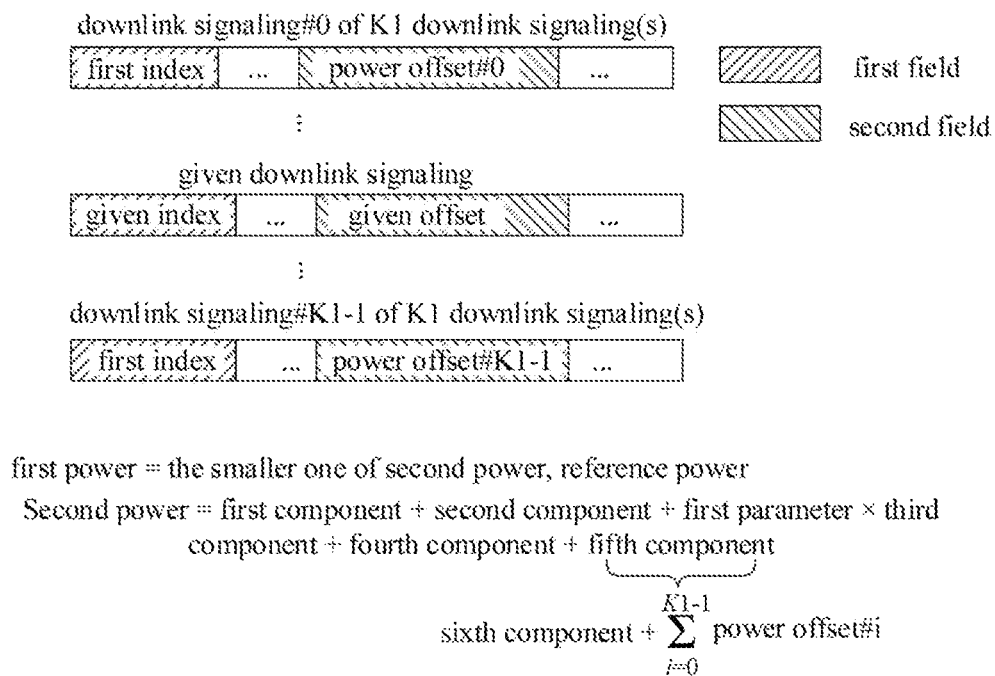
FIG. 2 shows a schematic diagram of constituent components of a first power according to one embodiment of the present disclosure.

Embodiment 2 illustrates a schematic diagram of constituent components of a first power, as shown in FIG. 2.

In Embodiment 2, the first power is the smallest one of second power and reference power, and the second power is respectively linear correlated with first component, second component, third component, fourth component, fifth component. The linear coefficients between the second power and the first component, the second component, the fourth component, and the fifth component are 1, and the linear coefficient between the second power and the third component is the first coefficient. The fifth component and the sum of the K1 power offset(s) is(are) linearly related. The K1 power offset(s) is(are) indicated by the second field of the K1 downlink signaling(s) respectively, and the K1 downlink signaling(s) is(are) K1 downlink signaling(s) in the K downlink signaling(s), a value of each first field of the K1 downlink signaling(s) is equal to a first index. The second power is not related to a given offset, the given offset is indicated by the second field of a given downlink signaling, the given downlink signaling is any downlink signaling whose first field value is not equal to the first index among the K downlink signaling(s).

In FIG. 2, a slash filled square represents a first field of one downlink signaling of the K downlink signaling(s); a back-slash filled square represents the second field of one downlink signaling of the K downlink signaling(s), the value of the first field in the given downlink signaling is a given index, and the given index is not equal to the first index.

In one embodiment, the unit of the first power is dBm.

In one embodiment, the first power is $P_{PUSCH,c}(i)$.

In one embodiment, the first power is $P_{SRS,c}(i)$.

In one embodiment, the first power is equal to the reference power, and the second power is greater than or equal to the reference power.

In one embodiment, the first power is less than the reference power.

In one embodiment, the reference power is $P_{CMAX,c}(i)$.

In one embodiment, the first power is equal to the second power, and the second power is less than or equal to the reference power.

In one embodiment, the first component is related to a bandwidth occupied by the first radio signal.

In a sub-embodiment of the foregoing embodiment, the first component is $10 \log_{10}(M_{PUSCH,c}(i))$.

In one embodiment, the second component is related to a scheduling type corresponding to the first radio signal.

In a sub-embodiment of the foregoing embodiment, the scheduling type comprises a semi-persistent grant, dynamic scheduled grant, and random access response grant.

In a sub-embodiment of the above embodiment, the second component is $P_{O\_PUSCH,c}(j)$.

In a sub-embodiment of the foregoing embodiment, the second component is configured by a higher layer signaling.

In a sub-embodiment of the foregoing embodiment, the second component is the cell-common.

In one embodiment, the third component is related to channel quality between the transmitter of the first radio signal and a receiver of the first radio signal.

In a sub-embodiment of the foregoing embodiment, the third component is $PL_c$.

In a sub-embodiment of the foregoing embodiment, the third component is not correlated with the target antenna virtualization vector, and the first index is used to determine the target antenna virtualization vector.

In a sub-embodiment of the foregoing embodiment, the third component is associated with the target antenna virtualization vector, and the first index is used to determine the target antenna virtualization vector.

In a sub-embodiment of the foregoing embodiment, the third component is equal to the transmitting power of the given reference signal minus the Reference Signal Received Power (RSRP) of the given reference signal.

In a sub-embodiment of the foregoing embodiment, the target antenna virtualization vector is used to receive the given reference signal, the transmitter of the given reference signal is a UE.

In a sub-embodiment of the foregoing embodiment, the target antenna virtualization vector is used to transmit the given reference signal, the receiver of the given reference signal is a UE.

In a sub-embodiment of the foregoing embodiment, the antenna virtualization vector for receiving and transmitting the given reference signal is irrelevant to the target antenna virtualization vector.

In one embodiment, the first coefficient is a non-negative number less than or equal to one.

In one embodiment, the first coefficient is $\alpha_c(j)$.

In one embodiment, the first coefficient is configured by the higher layer signaling.

In one embodiment, the first coefficient is the cell-common.

In one embodiment, the fourth component is related to an MCS of the first radio signal.

In one embodiment, the fourth component is $\Delta_{TF,c}(i)$.

In one embodiment, the fourth component is $P_{SRS\_OFFSET,c}(i)$.

In one embodiment, the fourth component is configured by the higher layer signaling.

In one embodiment, the fourth component is the cell-common.

In one embodiment, the K1 power offset(s) is(are) used to determine the fifth component.

In a sub-embodiment of the foregoing embodiment, the fifth component is $f_c(i)$.

In a sub-embodiment of the foregoing embodiment, the fifth component and the sum the K1 power offset(s) is linearly related, and the linear coefficient between the fifth component and the sum of the K1 power offset(s) is 1.

In a sub-embodiment of the foregoing embodiment, the fifth component is equal to the sum of the K1 power offset(s) plus a sixth component. In a sub-embodiment, the sixth component is configured by the higher layer signaling.

Embodiment 3

Figure 3:
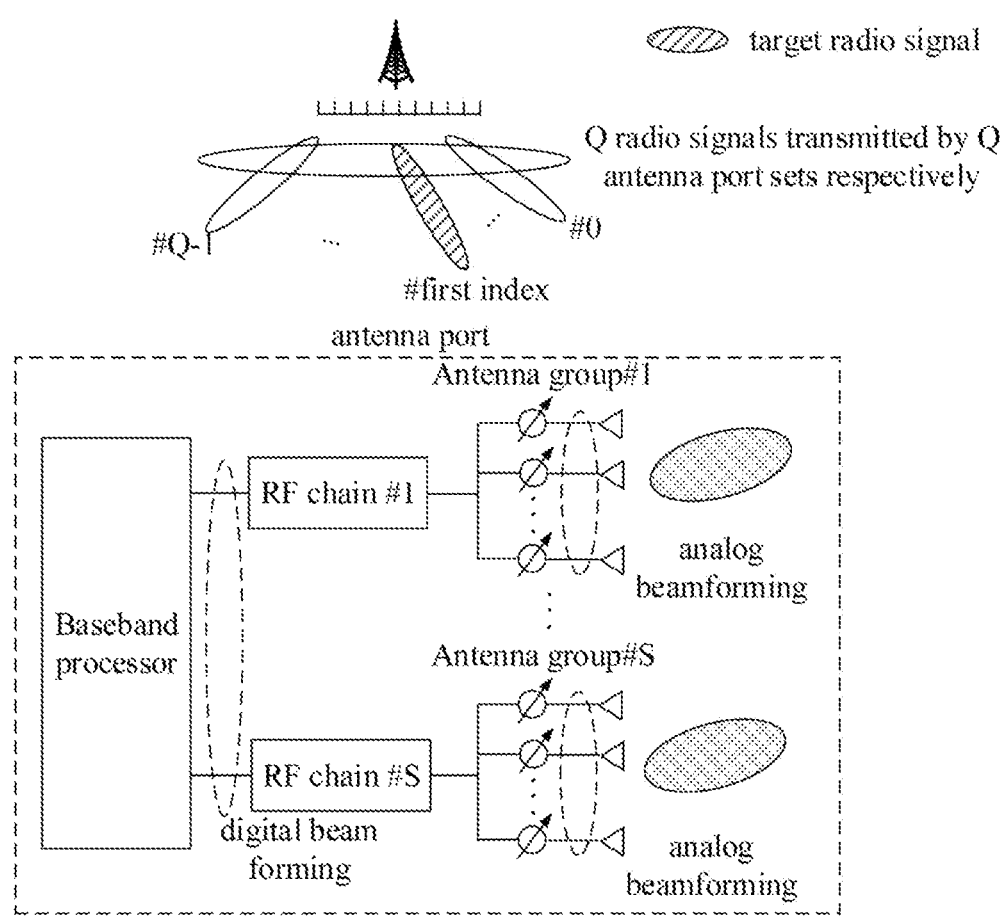
FIG. 3 shows a schematic diagram of the relationship between Q radio signals and a first index according to one embodiment of the present disclosure.

Embodiment 3 illustrates a schematic diagram of the relationship between the Q radio signals and the first index, as shown in FIG. 3.

In Embodiment 3, the Q radio signals are transmitted by Q antenna port sets respectively, the antenna port set comprises a positive integer number of antenna port(s), the first index is an integer less than the Q and not less than 0. The target radio signal is one of the Q radio signals, the target radio signal is transmitted on a target antenna port set, and an index of the target antenna port set among the Q antenna port set(s) is the first index. The antenna configured by the base station is divided into a plurality of antenna sets, and each of the antenna sets comprises a plurality of antennas. An antenna port is formed by superimposing multiple antennas in one or more antenna sets through antenna virtualization, and mapping coefficients of multiple antennas in the one or more antenna sets to the antenna port constitute a beamforming vector. An antenna set is connected to the baseband processor via a Radio Frequency (RF) chain. A beamforming vector is composed of a Kronecker product of an analog beamforming vector and a digital beamforming vector. The mapping coefficients of multiple antennas in one same antenna set to an antenna port constitute the analog beamforming vector of this antenna set, and the different antenna sets comprised in one antenna port correspond to the same analog beamforming vector. the mapping coefficients of different antenna sets included in an antenna port to the antenna port constitute a digital beamforming vector of this antenna port.

In FIG. 3, an ellipse with a solid line border indicates the Q radio signals, and an ellipse filled with slashes indicates the target radio signal.

In one embodiment, the target radio signal has the best receiving quality among the Q radio signals.

In a sub-embodiment of the foregoing embodiment, the receiving quality comprises one or two of the RSRP and the Reference Signal Received Quality (RSRQ).

In one embodiment, different antenna ports in an antenna port set correspond to the same analog beamforming vector.

In a sub-embodiment of the foregoing embodiment, the Q antenna virtualization vectors are the analog beamforming vectors corresponding to the Q antenna port sets respectively.

In one embodiment, different antenna ports in an antenna port set correspond to different digital beamforming vectors.

In one embodiment, the Q radio signals are also used to determine a first channel quality, and the first power and the first channel quality are linearly correlated in the present disclosure.

In a sub-embodiment of the foregoing embodiments, the first channel quality is an average of the Q first sub-channel qualities, the Q first sub-channel qualities are determined by the measurements for the Q radio signals respectively. Any first sub-channel quality among the Q first sub-channel qualities is equal to the transmitting power of the corresponding radio signal minus the RSRP of the corresponding radio signal.

In a sub-embodiment of embodiment foregoing embodiments, the first channel quality is one of the Q first sub-channel qualities; an index of the radio signal among the Q radio signals corresponding to the first channel quality is the first index.

In a sub-embodiment of the foregoing embodiment, the linear coefficient between the first power and the first channel quality is a non-negative number less than or equal to 1.

In a sub-embodiment of the foregoing embodiment, a linear coefficient between the first power and the first channel quality is $\alpha_c(j)$.

In a sub-embodiment of the foregoing embodiment, the linear coefficient between the first power and the first channel quality is configured by the higher layer signaling.

In a sub-embodiment of the foregoing embodiment, the linear coefficient between the first power and the first channel quality is the cell-common.

Embodiment 4

Figure 4:
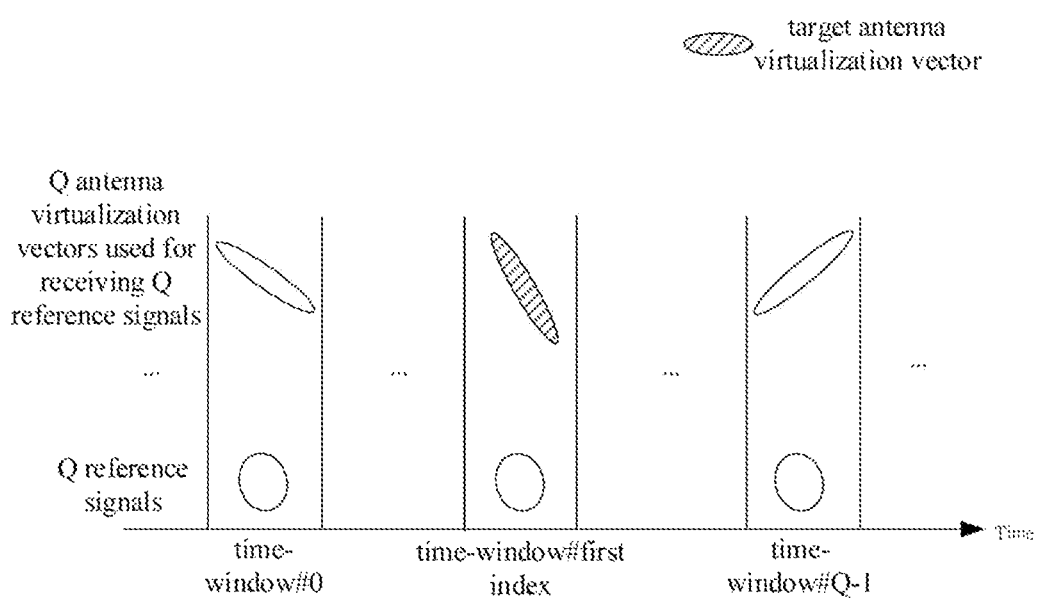
FIG. 4 shows a schematic diagram of a the relationship between Q reference signals and a first index according to one embodiment of the present disclosure.

Embodiment 4 illustrates a schematic diagram of the relationship between the Q reference signals and the first index, as shown in FIG. 4.

In Embodiment 4, the Q reference signals are respectively transmitted in Q time windows, and any two of the Q time windows are orthogonal, and the first index is an integer less than the Q and not less than 0. The Q reference signals correspond to the same transmitting antenna port, that is, to the same transmitting beamforming vector. The Q antenna virtualization vectors are respectively used as receiving beamforming vectors for receiving the Q reference signals. The target reference signal is one of the Q reference signals, the target antenna virtualization vector is used to receive the target reference signal, and the index of the target antenna virtualization vector in the Q antenna virtualization vectors is the first index.

In one embodiment, the target reference signal has the best receiving quality among the Q reference signals.

In a sub-embodiment of the foregoing embodiment, the receiving quality comprises one or two of the RSRP and the Reference Signal Received Quality (RSRQ).

In one embodiment, the transmitting antenna ports corresponding to the Q reference signals are used to transmit the first radio signal.

In one embodiment, the Q reference signals are also used to determine a second channel quality, the first power being linearly related to the second channel quality.

In a sub-embodiment of the foregoing embodiment, the second channel quality is an average of Q second sub-channel qualities, and the Q second sub-channel qualities are respectively determined by measurements for the Q reference signals. Any second sub-channel quality in the Q second sub-channel qualities is equal to a transmitting power of the corresponding reference signal minus the RSRP of the corresponding reference signal.

In a sub-embodiment of the foregoing embodiment, the second channel quality is one of the Q second sub-channel qualities, and an index of the reference signal corresponding to the second channel quality in the Q reference signals is the first index.

In a sub-embodiment of the foregoing embodiment, the linear coefficient between the first power and the second channel quality is a non-negative number less than or equal to 1.

In a sub-embodiment of the above embodiment, a linear coefficient between the first power and the second channel quality is $\alpha_c(j)$.

In a sub-embodiment of the foregoing embodiment, the linear coefficient between the first power and the second channel quality is configured by the higher layer signaling.

In a sub-embodiment of the foregoing embodiment, the linear coefficient between the first power and the second channel quality is the cell-common.

Embodiment 5

Figure 5:
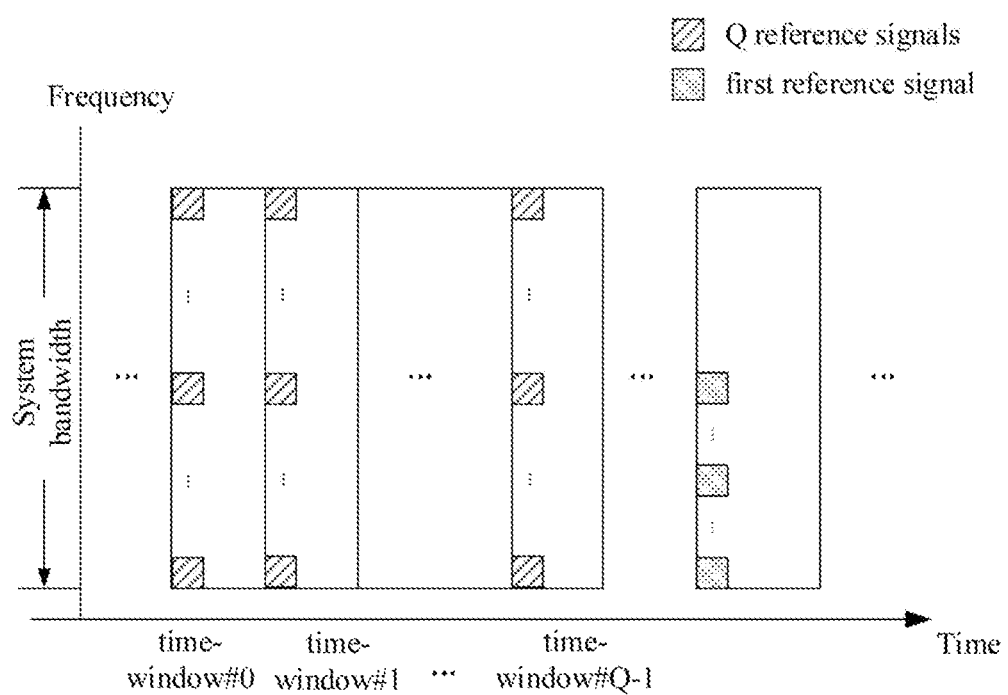
FIG. 5 shows a schematic diagram of a resource mapping of Q reference signals and first reference signal(s) according to one embodiment of the present disclosure.

Embodiment 5 illustrates a schematic diagram of resource mapping of Q reference signals and first reference signals, as shown in FIG. 5.

In Embodiment 5, the Q reference signals are respectively transmitted in Q time windows, any two of the Q time windows are orthogonal. The Q time windows and the time domain resource occupied by the first reference signal are orthogonal, respectively. The density of each of the Q reference signals on the frequency domain is less than the density of the first reference signal in the frequency domain.

In FIG. 5, a slash filled square indicates the Q reference signals, and a dot-filled square indicates the first reference signal.

In one embodiment, the density on the frequency domain refers to the number of subcarriers occupied in a unit frequency domain resource.

In a sub-embodiment of the foregoing embodiment, the unit frequency domain resource is Physical Resource Block (PRB).

In a sub-embodiment of the foregoing embodiment, the unit frequency domain resource comprises a positive integer number of consecutive subcarrier(s).

In one embodiment, the Q reference signals are wideband.

In a sub-embodiment of the foregoing embodiment, the system bandwidth is divided into positive integer frequency domain regions, and the Q reference signals appear in all frequency domain regions within the system bandwidth. the bandwidth corresponding to any one frequency domain region of the positive integer frequency domain regions is equal to the difference between frequencies of two adjacent frequency units occurred of any one of the Q reference signals.

In one embodiment, the first reference signal is narrowband.

In a sub-embodiment of the foregoing embodiment, the system bandwidth is divided into positive integer number of frequency domain region(s), and the first reference signal appears only in part of the positive integer number of frequency domain region.

In one embodiment, any one of the Q time windows occupies a positive integer number of wideband symbol(s) in the time domain.

In a sub-embodiment of the foregoing embodiment, the wideband symbol is one of an OFDM symbol, an SC-FDMA symbol, and an SCMA symbol.

In one embodiment, any two of the Q reference signals in the frequency domain have the same density.

Embodiment 6

Figure 6:
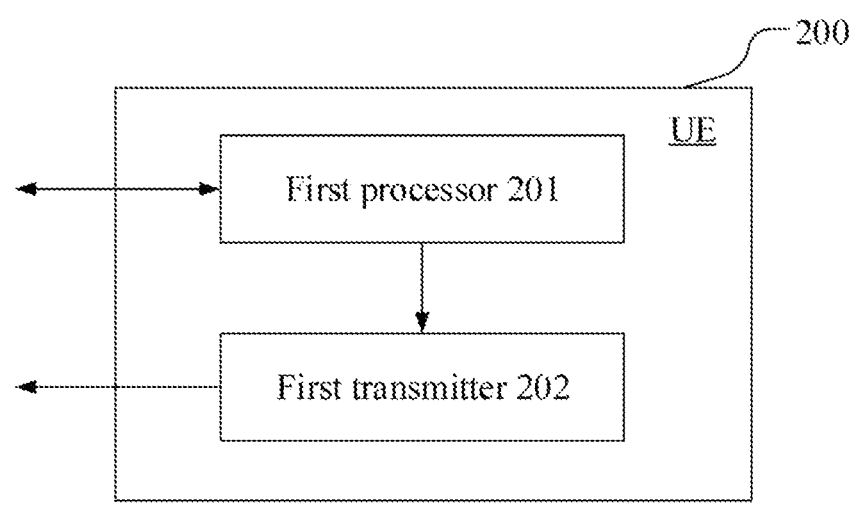
FIG. 6 shows a structural block diagram of a processing device for a UE according to one embodiment of the present disclosure.

Embodiment 6 illustrates a structural block diagram of a processing device in a UE, as shown in FIG. 6.

In FIG. 6, the UE device 200 is mainly composed of a first processor 201 and a first transmitter 202.

The first processor 201 receives K downlink signaling(s); the first transmitter 202 transmits the first radio signal.

In Embodiment 6, any one downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exist(s) among the K downlink signaling(s), a value of each first field of the K1 downlink signaling(s) is equal to a first index; the first power is linearly correlated with a sum of K1 power offset(s), the K1 power offset(s) is(are) respectively indicated by each second field of the K1 downlink signaling(s); the K is a positive integer, the K1 is a positive integer not greater than the K; the first index is an integer; the K downlink signaling(s) schedules(schedule) a same carrier. The value of the first field in the downlink signaling other than the K1 downlink signaling(s) among K downlink signaling(s) are all not equal to the first index.

In one embodiment, the first processor 201 also receives Q radio signals. Herein the Q radio signals are transmitted by Q antenna port sets respectively; the antenna port set comprises a positive integer number of antenna port(s). The first index is an integer less than the Q and not less than 0.

In one embodiment, the first processor 201 also transmits Q reference signals in Q time windows respectively. Any two of the Q time windows are orthogonal, the first index is an integer less than the Q and not less than 0.

In one embodiment, the first processor 201 also transmits a second radio signal. the second radio signal indicates Q1 antenna port set(s) of the Q antenna port sets, the Q1 antenna port set(s) comprises(comprise) a target antenna port set, an index of the target antenna port set among the Q antenna port sets is the first index, the Q1 is a positive integer not greater than the Q.

In one embodiment, a first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

In one embodiment, the first radio signal comprises a first reference signal, the first index is used to determine an RS sequence corresponding to the first reference signal; or a first bit block is used to generate the first radio signal, the first index is used to generate a scrambling sequence corresponding to the first bit block.

In one embodiment, the first index is an index of the target antenna virtualization vector in the Q antenna virtualization vectors; the target antenna virtualization vector is used to receive the first radio signal.

In an embodiment, the first index is used to determine the transmission antenna ports(port) of the first radio signal.

In one embodiment, the density of each reference signal of the Q reference signals on frequency domain is less than a density of the first reference signal in the frequency domain.

In one embodiment, the first power is not related to the second field of a given downlink signaling, the given downlink signaling is any downlink signaling whose first field value is not equal to the first index among the K downlink signaling(s).

Embodiment 7

Figure 7:
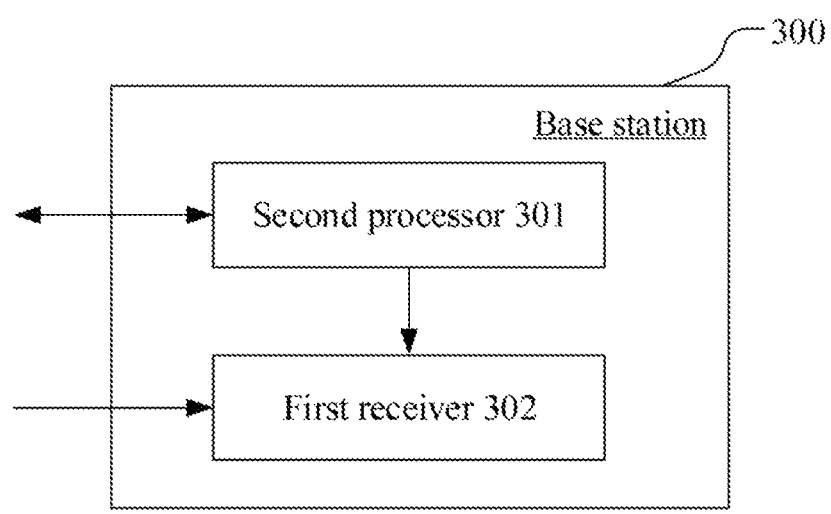
FIG. 7 shows a structural block diagram of a processing device for a base station according to one embodiment of the present disclosure.

Embodiment 7 illustrates a structural block diagram of a processing device in base station, as shown in FIG. 7.

In FIG. 7, the base station apparatus 300 is mainly composed of a second processor 301 and a first receiver 302.

The second processor 301 transmits K downlink signaling(s); the first receiver 302 receives the first radio signal.

In Embodiment 7, any downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exists(exist) among the K downlink signaling(s), a value of each first field of the K1 downlink signaling(s) is equal to a first index; the first power is linearly correlated with K1 power offset(s), the K1 power offset(s) is(are) indicated by each second field of the K1 downlink signaling(s) respectively; the K is a positive integer, the K1 is a positive integer not greater than the K; the first index is an integer; the K downlink signaling(s) schedules(schedule) a same carrier. The value(s) of the first field(s) in the downlink signaling(s) other than the K1 downlink signaling(s) among K downlink signaling(s) is(are) all not equal to the first index.

In one embodiment, the second processor 301 also transmits Q radio signals. Herein the Q radio signals are transmitted by Q antenna port sets respectively, the antenna port sets comprise a positive integer number of antenna port(s), the first index is an integer less than the Q and not less than 0.

In one embodiment, the second processor 301 also receives Q reference signals in Q time windows, respectively. Any two of the Q time windows are orthogonal, the first index is an integer less than the Q and not less than 0.

In one embodiment, the second processor 301 also receives a second radio signal. the second radio signal indicates Q1 antenna port set(s) of the Q antenna port sets, the Q1 antenna port set(s) comprises(comprise) a target antenna port set, an index of the target antenna port set among the Q antenna port sets is the first index, the Q1 is a positive integer not greater than the Q.

In one embodiment, a first signaling is a last downlink signaling received among the K downlink signaling(s), the first signaling comprises scheduling information of the first radio signal, the scheduling information comprises at least one of time domain resources occupied, frequency domain resources occupied, an MCS, a HARQ Process Number, an RV, and an NDI.

In one embodiment, the first radio signal comprises a first reference signal, the first index is used to determine an RS sequence corresponding to the first reference signal; or a first bit block is used to generate the first radio signal, the first index is used to generate a scrambling sequence corresponding to the first bit block.

In one embodiment, the first index is an index of the target antenna virtualization vector in the Q antenna virtualization vectors; the target antenna virtualization vector is used to receive the first radio signal.

In one embodiment the first index is used to determine the transmission antenna ports(port) of the first radio signal.

In one embodiment, the density of each reference signal of the Q reference signals on frequency domain is less than a density of the first reference signal in the frequency domain.

In one embodiment, the first power is not related to the second field of a given downlink signaling, the given downlink signaling is any downlink signaling whose first field value is not equal to the first index among the K downlink signaling(s).

Embodiment 8

Figure 8:
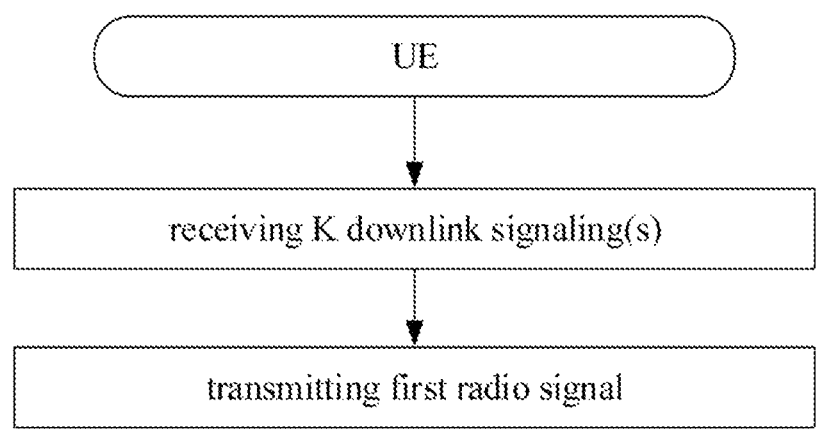
FIG. 8 shows flow chart of K downlink signaling(s) and the first radio signal according to one embodiment of the present disclosure.

Embodiment 8 illustrates a flow chart of K downlink signaling(s) and the first radio signal, as shown in FIG. 8.

In Embodiment 8, the user equipment in the present disclosure receives K downlink signaling(s), and then transmits the first radio signal. Wherein any one downlink signaling of the K downlink signaling(s) comprises a first field and a second field, the second field of any downlink signaling of the K downlink signaling(s) is used to determine a power offset; a transmitting power of the first radio signal is a first power; K1 downlink signaling(s) exist(s) among the K downlink signaling(s), a value of each first field of the K1 downlink signaling(s) is equal to a first index; the first power is linearly correlated with a sum of K1 power offset(s), the K1 power offset(s) is(are) respectively indicated by each second field of the K1 downlink signaling(s); the K downlink signaling(s) schedules(schedule) a same carrier; the first power is not related to the second field of a given downlink signaling, the given downlink signaling is any downlink signaling whose first field value is not equal to the first index among the K downlink signaling(s); the K is a positive integer, the K1 is a positive integer not greater than the K; the first index is an integer.

In one embodiment, the unit of the first power is dBm.

In one embodiment, the first power is $P_{PUSCH,c}(i)$, the $P_{PUSCH,c}(i)$ is transmission power of the UE on the Physical Uplink Shared CHannel (PUSCH) in the i-th subframe of the serving cell with index c, and the first radio signal is transmitted on the serving cell with the index c. The specific definition of $P_{PUSCH,c}(i)$ can be found in TS36.213.

In one embodiment, the first power is $P_{SRS,c}(i)$, the $P_{SRS,c}(i)$ is the transmission power used by the UE to transmit an Sounding Reference Signal (SRS) in the i-th subframe of the serving cell with index c, and the first radio signal is transmitted on the serving cell with the index c. The specific definition of $P_{SRS,c}(i)$ can be found in TS36.213.

In one embodiment, the first power is linearly related to a first component, and the first component is related to a bandwidth occupied by the first radio signal. The linear coefficient between the first power and the first component is 1.

In a sub-embodiment of the foregoing embodiment, the first component is $10\log_{10}(M_{PUSCH,c}(i))$, the $M_{PUSCH,c}(i)$ is a bandwidth in a unit of resource block, which is allocated by the PUSCH in the i-th subframe of the serving cell with the index c, and the first radio signal is transmitted on the serving cell with the index c. The specific definition of $M_{PUSCH,c}(i)$ can be found in TS 36.213.

In one embodiment, the first power and the second component are linearly related, and the second component is related to a scheduling type corresponding to the first radio signal. A linear coefficient between the first power and the second component is 1.

In a sub-embodiment of the foregoing embodiment, the scheduling type comprises a semi-persistent grant, a dynamic scheduled grant, and a random access response grant.

In a sub-embodiment of the foregoing embodiment, the second component is $P_{O\_PUSCH,c}(j)$, the $P_{O\_PUSCH,c}(j)$ is the power offset related to the scheduling type of index j on the serving cell with index c, and the first radio signal is transmitted on the serving cell with index c. The specific definition of $P_{O\_PUSCH,c}(j)$ can be found in TS36.213.

In a sub-embodiment of the foregoing embodiment, the second component is configured by a higher layer signaling.

In a sub-embodiment of the above embodiment, the second component is cell-common.

In one embodiment, the first power and the third component are linearly related, the third component being related to a channel quality between the UE and a receiver of the first radio signal.

In a sub-embodiment of the foregoing embodiment, the linear coefficient between the first power and the third component is a non-negative number less than or equal to 1.

In a sub-embodiment of the foregoing embodiment, the linear coefficient between the first power and the third component is $\alpha_c(j)$, the $\alpha_c(j)$ is a partial path loss compensation factor associated with the scheduling type index j in the serving cell with index c, the first radio signal being transmitted on the serving cell with index c. The specific definition of $\alpha_c(j)$ can be found in TS36.213.

In a sub-embodiment of the foregoing embodiment, the linear coefficient between the first power and the third component is configured by the higher layer signaling.

In a sub-embodiment of the foregoing embodiment, the linear coefficient between the first power and the third component is the cell-common.

In a sub-embodiment of the foregoing embodiment, the third component is $PL_c$, the $PL_c$ is a path loss estimation value of the UE in dB in a serving cell with index c, the first radio signal being transmitted on a serving cell with index c. The specific definition of $PL_c$ can be found in TS36.213.

In a sub-embodiment of the foregoing embodiment, the third component is not correlated with the target antenna virtualization vector, and the first index is used to determine the target antenna virtualization vector.

In a sub-embodiment of the foregoing embodiment, the third component is associated with the target antenna virtualization vector, and the first index is used to determine the target antenna virtualization vector.

In a sub-embodiment of the foregoing embodiment, the third component is equal to the transmission power of the given reference signal minus the Reference Signal Received Power (RSRP) of the given reference signal.

In a sub-embodiment of the foregoing embodiment, the target antenna virtualization vector is used to receive the given reference signal, and the transmitter of the given reference signal is the UE.

In a sub-embodiment of the foregoing embodiment, the target antenna virtualization vector is used to transmit the given reference signal, and the receiver of the given reference signal is the UE.

In a sub-embodiment of the foregoing embodiment, the antenna virtualization vector for receiving and transmitting the given reference signal is irrelevant with the target antenna virtualization vector.

In one embodiment, the first power and the fourth component are linearly related. The linear coefficient between the first power and the fourth component is 1.

In a sub-embodiment of the foregoing embodiment, the fourth component is related to a MCS of the first radio signal.

In a sub-embodiment of the foregoing embodiment, the fourth component is $\Delta_{TF,c}(i)$, the $\Delta_{TF,c}(i)$ is the power offset associated with the MCS of the UE in the i-th subframe of the serving cell with index c, the first radio signal is transmitted on the serving cell with index c. The specific definition of $\Delta_{TF,c}(i)$ can be found in TS36.213.

In a sub-embodiment of the foregoing embodiment, the fourth component is $P_{SRS\_OFFSET,c}(i)$, the $P_{SRS\_OFFSET,c}(i)$ is offset of the transmit power of the SRS relative to the PUSCH in the i-th subframe of the serving cell with index c, and the first radio signal is transmitted on the serving cell with index c. The specific definition of $P_{SRS\_OFFSET,c}(i)$ can be found in TS36.213.

In a sub-embodiment of the foregoing embodiment, the fourth component is configured by the higher layer signaling.

In a sub-embodiment of the foregoing embodiment, the fourth component is cell-common.

In one embodiment, the first power and the fifth component are linearly related, and the K1 power offset(s) is(are) used to determine the fifth component. The linear coefficient between the first power and the fifth component is 1.

In a sub-embodiment of the foregoing embodiment, the power offset is indicated by TPC.

In a sub-embodiment of the foregoing embodiment, the fifth component and the sum of the K1 power offset(s) are linearly related, and the linear coefficient between the fifth component and the sum of the K1 power offsets is 1.

In a sub-embodiment of the foregoing embodiment, the fifth component is $f_c(i)$, the $f_c(i)$ is a state of uplink power control adjustment on the PUSCH in the i-th subframe in the serving cell with index c, and the first radio signal is transmitted on the serving cell with index c. The specific definition of $f_c(i)$ can be found in TS36.213.

In one embodiment, the first power is equal to $P_{CMAX,c}(i)$, the $P_{CMAX,c}(i)$ is highest transmit power threshold configured by the UE in the i-th subframe of the serving cell with index c, and the first radio signal is transmitted on the serving cell with index c. The specific definition of $P_{CMAX,c}(i)$ can be found in TS36.213.

In one embodiment, the first power is less than $P_{CMAX,c}(i)$.

In one embodiment, the first field comprises 2 bits.

In one embodiment, the first field comprises 3 bits.

In one embodiment, the first field comprises 4 bits.

In one embodiment, the first index is a non-negative integer.

In one embodiment, the second field is a TPC.

In one embodiment, the sum of the K1 power offsets is used to determine $f_c(i)$.

In one embodiment, the time domain resources occupied by any two of the K downlink signaling(s) are orthogonal (i.e., do not overlap each other).

In one embodiment, the first power is irrelevant to the second field in a given downlink signaling, the given downlink signaling is any downlink signaling whose first field value is not equal to the first index among the K downlink signaling(s).

In one embodiment, the K downlink signaling(s) is(are) all dynamic signaling(s).

In one embodiment, the K downlink signaling(s) is(are) dynamic signaling for UpLink Grant.

In one embodiment, a linear coefficient between the first power and the sum of the K1 power offset(s) is 1.

In one embodiment, the first radio signal comprises the SRS.

In one embodiment, the first radio signal is transmitted on the physical layer data channel.

In one embodiment, the K downlink signaling(s) is(are) transmitted on a downlink physical layer control channel (i.e., a downlink channel that can only be used to carry physical layer signaling).

Embodiment 9

Figure 9:
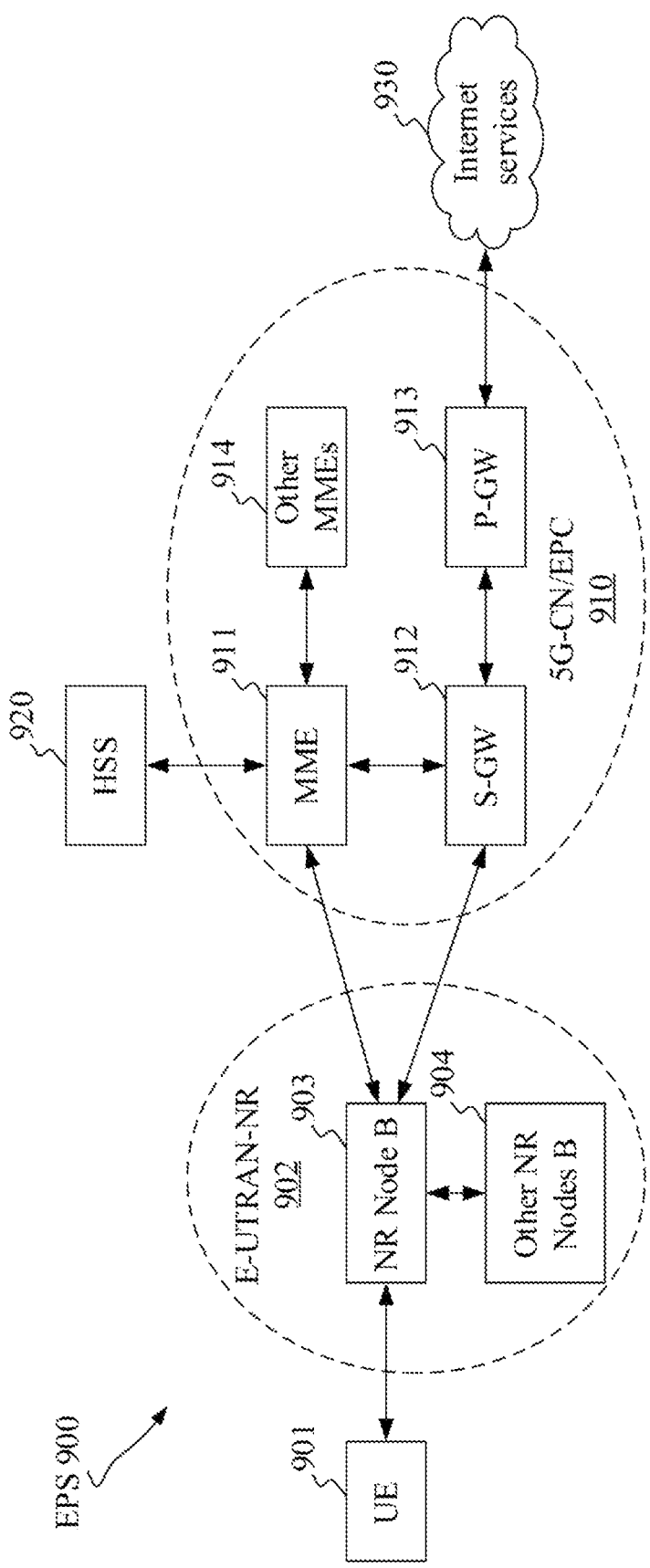
FIG. 9 shows a schematic diagram of a network architecture according to one embodiment of the present disclosure.

Embodiment 9 illustrates a schematic diagram of network architecture, as shown in FIG. 9.

FIG. 9 describes a system network structure 900 of NR 5G, long-term evolution (LTE) and long-term evolution advanced (LTE-A). The network architecture 900 of NR 5G or LTE may be referred to as an evolve packet system (EPS) 900 or some other suitable terminology. The EPS 900 may include one or more UEs 901, evolved UMTS terrestrial radio access network—new radio (E-UTRAN-NR) 902, 5G-core network (5G-CN)/evolved packet core (EPC) 910, home subscriber server (HSS) 920 and the internet service 930. The UMTS corresponds to the universal mobile telecommunications system. The EPS may be interconnected with other access networks, but for the sake of simplicity, these entities/interfaces are not shown. As shown in FIG. 9, the EPS provides the packet switching services. Those skilled in the art would readily appreciate that the various concepts presented throughout this disclosure can be extended to networks or other cellular networks that provide circuit switched services. The E-UTRAN-NR comprises an NR Node B (gNB) 903 and other gNBs 904. The gNB 903 provides user and control plane protocol termination for the UE 901. The gNB 903 can be connected to other gNBs 904 via an X2 interface (e.g., a backhaul). The gNB 903 may also be referred to as a base station, a base transceiver station, a radio base station, a radio transceiver, a transceiver function, a basic service set (BSS), an extended service set (ESS), a transmission and reception point (TRP), or some other suitable terminology. The gNB 903 provides the UE 901 with an access point to the 5G-CN/EPC 910. In the embodiment, the UE 901 comprises cellular telephones, smart phones, Session Initiation Protocol (SIP) phones, laptop computers, personal digital assistants (PDAs), satellite radios, non-terrestrial base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 901 as a mobile station, a subscriber station, a mobile unit, a subscriber unit, a radio unit, a remote unit, a mobile device, a radio device, a radio communication device, a remote device, a mobile subscriber station, an access terminal, a mobile terminal, a radio terminal, remote terminal, handset, user agent, mobile client, client or some other suitable term. The gNB 903 is connected to the 5G-CN/EPC 910 through an S1 interface. 5G-CN/EPC 910 comprises MME 911, other Mobility Management Entity (MME) 914, a Service Gateway (S-GW) 912 and a Packet Date Network Gateway (P-GW) 913. The MME 911 is a control node that handles signaling between the UE 901 and the 5G-CN/EPC 910. In general, MME 911 provides bearer and connection management. All User Internet Protocol (IP) packets are transmitted through the S-GW 912, and the S-GW 912 itself is connected to the P-GW 913. The P-GW 913 provides UE IP address allocation as well as other functions. The P-GW 913 is connected to the internet service 930. The internet service 930 includes an operator-compatible internet protocol service, and may specifically include the Internet, an intranet, an IP Multimedia Subsystem (IMS), and a PS streaming service (PSS).

In one embodiment, the UE 901 corresponds to the UE in this disclosure.

In one embodiment, the gNB 903 corresponds to the base station in this disclosure.

Embodiment 10

Figure 10:
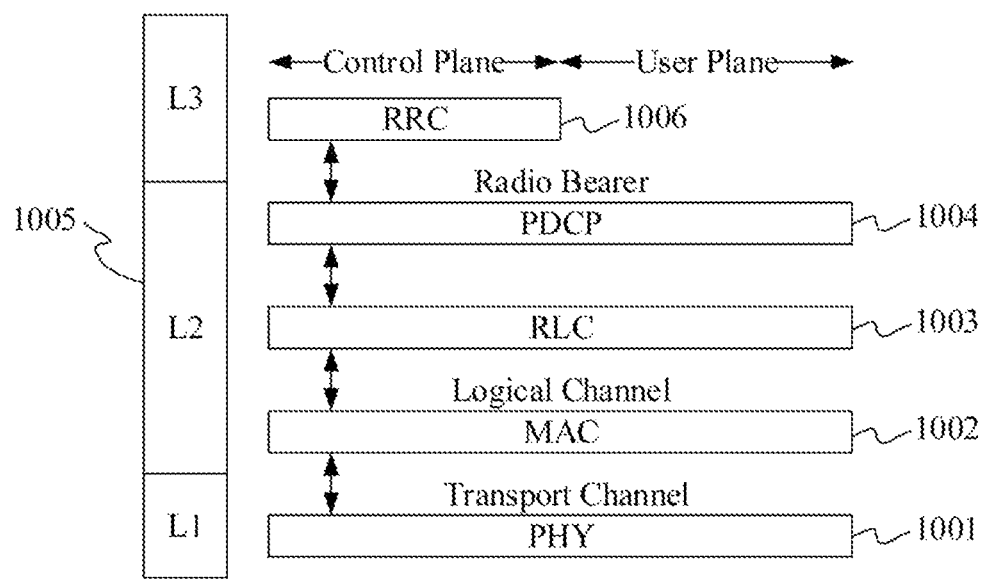
FIG. 10 shows a schematic diagram of a radio protocol architecture of a user plane and a control plane according to one embodiment of the present disclosure.

Embodiment 10 illustrates a schematic diagram of radio protocol architecture of a user plane and a control plane according to the present disclosure, as shown in FIG. 10.

FIG. 10 is a schematic diagram illustrating an embodiment of a radio protocol architecture for a user plane and a control plane, and FIG. 10 illustrates a radio protocol architecture for the UE and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 1001. Layer 2 (L2 layer) 1005 is above PHY 1001 and is responsible for the link between the UE and the gNB through PHY 1001. In the user plane, L2 layer 1005 comprises a media access control (MAC) sub-layer 1002, a radio link control (RLC) sub-layer 1003 and a packet data convergence protocol (PDCP) sub-layer 1004, and these sub-layers terminate at the gNB on the network side. Although not illustrated, the UE may have several upper layers above the L2 layer 1005, including a network layer (e.g. an IP layer) terminated at the P-GW on the network side and terminated at the other e of the connection (e.g. Application layer at the remote UE, server, etc.). The PDCP sub-layer 1004 provides multiplexing between different radio bearers and logical channels. The PDCP sublayer 1004 also provides header compression for upper layer data packets to reduce radio transmission overhead, and provides security by encrypting data packets, and provides handoff support for UEs between gNBs. The RLC sublayer 1003 provides segmentation and reassembly of upper layer data packets, retransmission of lost packets and the reordering of data packets to compensate for the disordered reception resulted by the hybrid automatic repeat request (HARQ). The MAC sublayer 1002 provides multiplexing between the logical and transport channels. The MAC sublayer 1002 is also responsible for allocating various radio resources (e.g. resource blocks) in one cell between UEs. The MAC sublayer 1002 is also responsible for HARQ operations. In the control plane, the radio protocol architecture for the UE and gNB is substantially the same for the physical layer 1001 and the L2 layer 1005, but there is no header compression function for the control plane. The control plane also comprises an Radio Resource Control (RRC) sublayer 1006 in Layer 3 (L3 layer). The RRC sublayer 1006 is responsible for obtaining radio resources (i.e. radio bearers) and configuring the lower layer using an RRC signaling between the gNB and the UE.

In one embodiment, the radio protocol architecture of FIG. 10 is applicable to the user equipment in this disclosure.

In one embodiment, the radio protocol architecture of FIG. 10 is applicable to the base station in this disclosure.

In one embodiment, the K downlink signaling(s) in the present disclosure is(are) generated by the PHY 1001.

In one embodiment, the first radio signal in the present disclosure is generated by the PHY 1001.

In one embodiment, the first reference signal in the present disclosure is generated by the PHY 1001.

In one embodiment, the Q radio signals in the present disclosure are generated by PHY 1001.

In one embodiment, the Q reference signals in the present disclosure are generated by PHY 1001.

In one embodiment, the second radio signal in the present disclosure is generated by PHY 1001.

Embodiment 11

Figure 11:
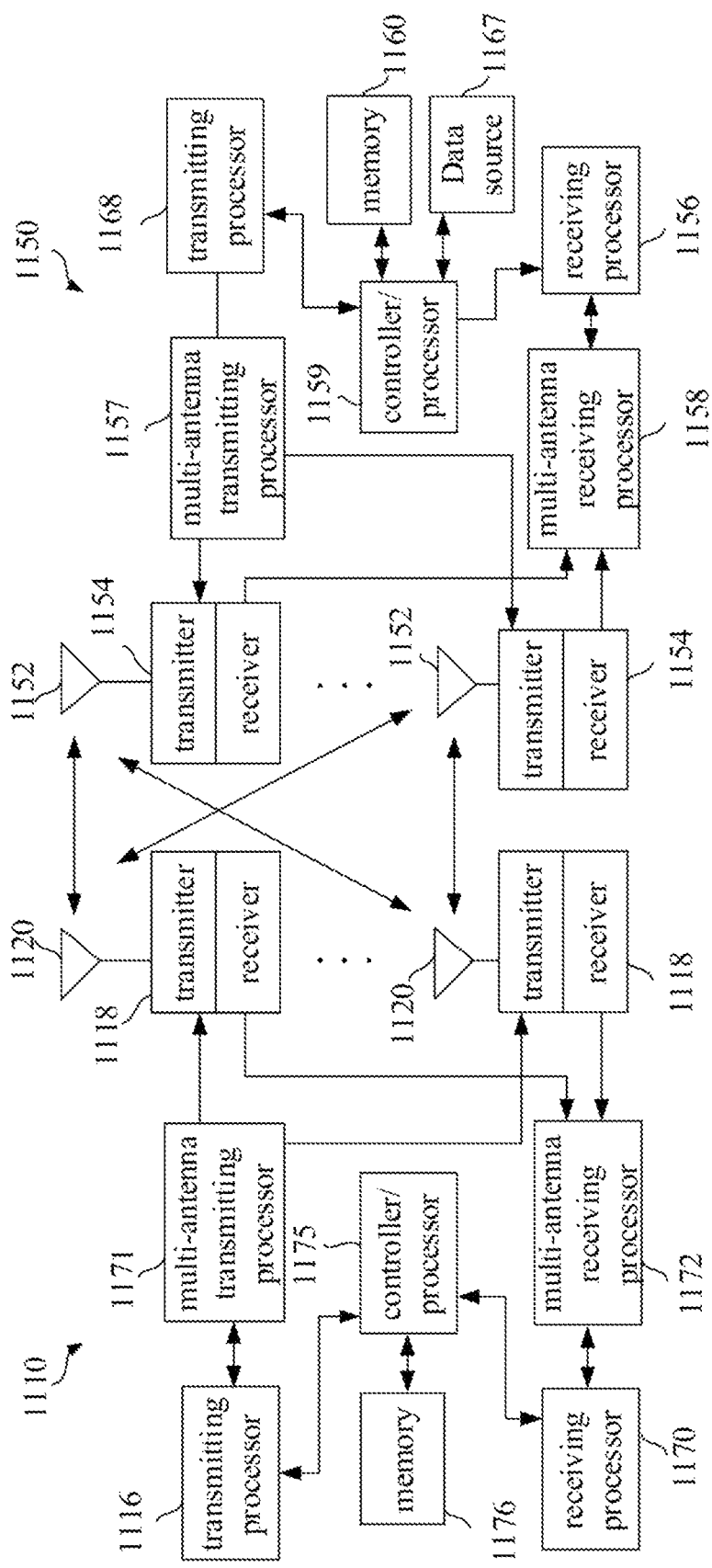
FIG. 11 shows a schematic diagram of an evolved node and a UE according to one embodiment of the present disclosure.

Embodiment 11 illustrates a schematic diagram of a New Radio (NR) node and a UE, as shown in FIG. 11. In FIG. 11 is a block diagram of a gNB 1110 in communication with a UE 1150 in an access network.

The gNB 1110 comprises a controller/processor 1175, a memory 1176, a receiving processor 1170, a transmitting processor 1116, a multi-antenna receiving processor 1172, a multi-antenna transmitting processor 1171, a transmitter/receiver 1118, and an antenna 1120.

The user equipment 1150 comprises a controller/processor 1159, a memory 1160, a data source 1167, a transmitting processor 1168, a receiving processor 1156, a multi-antenna transmitting processor 1157, a multi-antenna receiving processor 1158, a transmitter/receiver 1154, and an antenna 1152.

In DL (Downlink), at gNB 1110, upper layer data packets from the core network are provided to controller/processor 1175. The controller/processor 1175 implements the L2 layer functionality. In the DL, the controller/processor 1175 provides header compression, encryption, packet segmentation and reordering, multiplexing between logical and transport channels, and radio resource allocation for the UE 1150 based on various priority metrics. The controller/processor 1175 is also responsible for HARQ operations, retransmission of lost packets, and signaling to the UE 1150. The transmitting processor 1116 and multi-antenna transmitting processor 1171 implement various signal processing functions for the L1 layer (i.e., the physical layer). Transmitting processor 1116 performs encoding and interleaving to facilitate forward error correction (FEC) at UE 1150, mapping of signal clusters based on various modulation schemes (e.g., binary phase shift keying (BPSK), quadrature phase shift keying (QPSK), M-phase shift keying (M-PSK), M quadrature amplitude modulation (M-QAM)). The multi-antenna transmitting processor 1171 performs digital spatial precoding/beamforming on encoded and modulated to generate one or more spatial streams. The transmitting processor 1116 then maps each spatial stream to sub-carriers, which are multiplexed with reference signals (e.g., pilots) in time domain and/or frequency domain, and then uses an inverse fast Fourier transform (IFFT) to generate a physical channel carrying a time-domain multi-carrier symbol stream. The multi-antenna transmitting processor 1171 then performs an analog precoding/beamforming operation on the time domain multi-carrier symbol stream. Each transmitter 1118 converts a baseband multicarrier symbol stream provided by the multi-antenna transmitting processor 1171 into a radio frequency stream, which is then provided to a different antenna 1120.

In DL (Downlink), at UE 1150, each receiver 1154 receives a signal through its corresponding antenna 1152. Each receiver 1154 recovers the information modulated into a radio frequency carrier and converts the radio frequency stream into a baseband multi-carrier symbol stream to be provided to the receiving processor 1156. The receiving processor 1156 and multi-antenna receiving processor 1158 implement various signal processing functions of the L1 layer. The multi-antenna receiving processor 1158 performs a receiving analog precoding/beamforming operation on the baseband multi-carrier symbol stream from receiver 1154. The receiver processor 1156 converts the received analog precoded/beamforming operated baseband multicarrier symbol stream from time domain to frequency domain using Fast Fourier transform (FFT). In the frequency domain, the physical layer data signal and the reference signal are demultiplexed by the receiving processor 1156, wherein the reference signal will be used for channel estimation, and the data signal is recovered by the multi-antenna detection in the multi-antenna receiving processor 1158 to output any UE 1150-oriented spatial stream. The symbols on each spatial stream are demodulated and recovered in the receiving processor 1156 to generate a soft decision. The receiving processor 1156 then decodes and deinterleaves the soft decision to recover the upper layer data and control signals transmitted by the gNB 1110 on the physical channel. The upper layer data and control signals are then provided to the controller/processor 1159. The controller/processor 1159 implements the functions of the L2 layer. The controller/processor 1159 can be associated with memory 1160 that stores program codes and data. The memory 1160 can be referred to as a computer readable medium. In the DL, the controller/processor 1159 provides demultiplexing, packet reassembly, decryption, header decompression, and control signal processing between the transport and logical channels to recover an upper layer packet that came from the core network. The upper layer packet is then provided to all protocol layers above the L2 layer, or various control signals can also be provided to L3 for processing. The controller/processor 1159 is also responsible for error detection using an acknowledgement (ACK) and/or negative acknowledgement (NACK) protocol to support HARQ operations.

In Uplink (UL), at UE 1150, data source 1167 is used to provide an upper layer data packet to the controller/processor 1159. The data source 1167 represents all protocol layers above the L2 layer. Similar to the transmitting function at gNB 1110 described in the DL, the controller/processor 1159 implements header compression, encryption, packet segmentation and reordering, and multiplexing between the logical and transport channels based on the radio resource allocation of the gNB 1110, to implement L2 layer functions for the user plane and control plane. The controller/processor 1159 is also responsible for HARQ operations, retransmission of lost packets, and a signaling to the gNB 1110. A transmitting processor 1168 performs modulation mapping, channel coding processing, and the multi-antenna transmitting processor 1157 performs digital multi-antenna spatial precoding/beamforming processing, after that the transmitting processor 1168 modulates the generated spatial stream into a multi-carrier/single-carrier symbol stream, which is provided to different antennas 1152 via transmitter 1154 after an analog pre-coding/beamforming operation in multi-antenna transmitting processor 1157. Each transmitter 1154 first converts the baseband symbol stream provided by the multi-antenna transmit processor 1157 into a stream of radio frequency symbols and provides the stream of radio frequency symbols to the antenna 1152.

In UL (Uplink), the function at gNB 1110 is similar to the receiving function at UE 1150 described in the DL. Each receiver 1118 receives a radio frequency signal through respective antenna 1120, converts the received radio frequency signal into a baseband signal, and provides the baseband signal to the multi-antenna receiving processor 1172 and the receiving processor 1170. The receiving processor 1170 and the multi-antenna receiving processor 1172 collectively implement the functions of the L1 layer. The controller/processor 1175 implements the L2 layer function. The controller/processor 1175 can be associated with the memory 1176 that stores program codes and data. The memory 1176 can be referred to as a computer readable medium. In the UL, the controller/processor 1175 provides demultiplexing, packet reassembly, decryption, header decompression, control signal processing between the transport and logical channels to recover upper layer data packet that came from the UE 1150. The upper layer data packet from the controller/processor 1175 can be provided to the core network. The controller/processor 1175 is also responsible for error detection using ACK and/or NACK protocols to support HARQ operations.

In one embodiment, the UE 1150 comprises: at least one processor and at least one memory, the at least one memory including computer program codes; the at least one memory and the computer program code are configured to operate with at least one processor together.

In one sub-embodiment, the UE 1150 comprises a memory storing a computer readable instruction program, which generates an action when executed by at least one processor, and the action comprises: receiving the K downlink signaling(s) in the present disclosure, transmitting the first radio signal in the present disclosure, receiving Q radio signals in the present disclosure, transmitting the Q reference signals in the present disclosure in Q time windows in the present disclosure respectively, and transmitting the second radio signal in the present disclosure.

In one sub-embodiment, the gNB 1110 device comprises: at least one processor and at least one memory, the at least one memory comprises computer program codes; the at least one memory and the computer program code are configured to be operated with at least one processor together.

In one sub-embodiment, the gNB 1110 comprises: a memory storing a computer readable instruction program that, when executed by at least one processor, generates an action, the action comprising: transmitting the K downlink signaling(s) in the present disclosure, receiving the first radio signal in this disclosure, transmitting the Q radio signals in this disclosure, receiving the Q reference signals in this disclosure in the Q time windows in this disclosure respectively, and receiving the second radio signal in this disclosure.

In one sub-embodiment, the UE 1150 corresponds to the UE in this disclosure.

In one sub-embodiment, the gNB 1110 corresponds to the base station in this disclosure.

In one embodiment, at least one of the antenna 1152, the receiver 1154, the receiving processor 1156, the multi-antenna receiving processor 1158, and the controller/processor 1159 is used to receive the K downlink signaling(s); at least one of the antenna 1120, the transmitter 1118, the transmitting processor 1116, the multi-antenna transmitting processor 1371, the controller/processor 1175 is used to transmit the K downlink signaling(s).

In one embodiment, at least one of the antenna 1120, the receiver 1118, the receiving processor 1170, the multi-antenna receiving processor 1172, and the controller/processor 1175 is used to receive the first radio signal; at least one of the antenna 1152, the transmitter 1154, the transmitting processor 1168, the multi-antenna transmitting processor 1157, the controller/processor 1159 is used to transmit the first radio signal.

In one embodiment, at least one of the antenna 1152, the receiver 1154, the receiving processor 1156, the multi-antenna receiving processor 1158, and the controller/processor 1159 is used to receive the Q radio signals; at least one of the antenna 1120, the transmitter 1118, the transmitting processor 1116, the multi-antenna transmitting processor 1171, and the controller/processor 1175 is used to transmit the Q radio signals.

In one embodiment, at least one of the antenna 1120, the receiver 1118, the receiving processor 1170, the multi-antenna receiving processor 1172, and the controller/processor 1175 is used to receive the Q reference signals; at least one of the antenna 1152, the transmitter 1154, the transmitting processor 1168, the multi-antenna transmitting processor 1157, and the controller/processor 1159 is used to transmit the Q reference signals.

In one embodiment, at least one of the antenna 1120, the receiver 1118, the receiving processor 1170, the multi-antenna receiving processor 1172, and the controller/processor 1175 is used to receive the second radio signal; at least one of the antenna 1152, the transmitter 1154, the transmitting processor 1168, the multi-antenna transmitting processor 1157, and the controller/processor 1159 is used to transmit the second radio signal.

In one embodiment, the first processor 201 comprises at least one of the antenna 1152, the transmitter/receiver 1154, transmitting processor 1168, the receiving processor 1156, the multi-antenna transmitting processor 1157, the multi-antenna receiving processor 1158, the controller/processor 1159, the memory 1160, and the data sources 1167 in Embodiment 6.

In one embodiment, the first transmitter 202 comprises at least one of the antenna 1152, the transmitter 1154, the transmitting processor 1168, the multi-antenna transmission processor 1157, the controller/processor 1159, the memory 1160, and the data source 1167 in embodiment 6.

In one embodiment, the second processor 301 comprises at least one of the antenna 1120, the receiver/transmitter 1118, the receiving processor 1170, the transmitting processor 1116, the multi-antenna receiving processor 1172, the multi-antenna transmitting processor 1171, the controller/processor 1175, and the memory 1176 in Embodiment 7.

In one embodiment, the first receiver 302 comprises at least one of the antenna 1120, the receiver 1118, the receiving processor 1170, the multi-antenna receiving processor 1172, the controller/processor 1175, and the memory 176 in Embodiment 7.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, radio sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for power adjustment, comprising:
   receiving K downlink signaling(s); and
   transmitting a first radio signal;
   wherein any downlink signaling of the K downlink signaling(s) comprises a first field and a second field; the second field is a TPC, the second field of any downlink signaling of the K downlink signaling(s) is used to determine a power offset; a transmitting power of the first radio signal is a first power; K1 downlink signaling(s) exist(s) among the K downlink signaling(s); a value of the first field of each of the K1 downlink signaling(s) is equal to a first index; the first power is a smallest one of a second power and a reference power, and the second power is respectively linearly correlated with a first component, a second component, a third component, and a fifth component; the first component is related to a bandwidth occupied by the first radio signal; the second component is configured by a higher layer signaling; the third component is related to a channel quality between the User Equipment and a receiver of the first radio signal; the fifth component and a sum of the K1 power offset(s) is linearly related, and the linear coefficient between the fifth component and the sum of the K1 power offset(s) is 1; linear coefficients between the second power and the first component, the second component and the fifth component are 1 respectively, and a linear coefficient between the second power and the third component is a first coefficient, the first coefficient is a non-negative number less than or equal to one; the K1 power offset(s) is(are) respectively indicated by the second field(s) of the K1 downlink signaling(s); the K downlink signaling(s) schedules(schedule) a same carrier, the K downlink signaling(s) is(are) all transmitted on PDCCH; the first power is not related to the second field of a given downlink signaling, the given downlink signaling is any downlink signaling whose first field value is not equal to the first index among the K downlink signaling(s), the second power is not related to the second field of the given downlink signaling; the K is a positive integer, the K1 is a positive integer not greater than the K; the first index is a non-negative integer; the first radio signal comprises a first reference signal, the first index is used to determine an RS sequence corresponding to the first reference signal, the first reference signal is SRS; the unit of the first power is dBm.

2. The method according to claim 1, wherein the first coefficient is configured by higher layer signaling.

3. The method according to claim 1, wherein the third component is equal to a transmission power of a given reference signal minus a RSRP of the given reference signal;
or, the third component is associated with a target antenna virtualization vector, and the first index is used to determine the target antenna virtualization vector.

4. The method according to claim 1, wherein the third component is a path loss value estimated in dB by the UE in a serving cell with index c, the first radio signal being transmitted on the serving cell with index c.

5. The method according to claim 1, wherein the reference power is a highest transmit power threshold the UE configured in the i-th subframe of the serving cell with index c, and the first radio signal is transmitted on the serving cell with index c;
or, time domain resources occupied by any two of the K downlink signalings are orthogonal.

6. A method in a base station for power adjustment, comprising:
transmitting K downlink signaling(s); and
receiving a first radio signal;
wherein any downlink signaling of the K downlink signaling(s) comprises a first field and a second field; the second field is a TPC, the second field of any downlink signaling of the K downlink signaling(s) is used to determine a power offset; a transmitting power of the first radio signal is a first power; K1 downlink signaling(s) exist(s) among the K downlink signaling(s); a value of the first field of each of the K1 downlink signaling(s) is equal to a first index; the first power is a smallest one of a second power and a reference power, and the second power is respectively linearly correlated with a first component, a second component, a third component, and a fifth component; the first component is related to a bandwidth occupied by the first radio signal; the second component is configured by a higher layer signaling; the third component is related to a channel quality between a transmitter of the first radio signal and the base station; the fifth component and a sum of the K1 power offset(s) is linearly related, and the linear coefficient between the fifth component and the sum of the K1 power offset(s) is 1; linear coefficients between the second power and the first component, the second component and the fifth component are 1 respectively, and a linear coefficient between the second power and the third component is a first coefficient, the first coefficient is a non-negative number less than or equal to one; the K1 power offset(s) is(are) respectively indicated by the second field(s) of the K1 downlink signaling(s); the K downlink signaling(s) schedules(schedule) a same carrier, the K downlink signaling(s) is(are) all transmitted on PDCCH; the first power is not related to the second field of a given downlink signaling, the given downlink signaling is any downlink signaling whose first field value is not equal to the first index among the K downlink signaling(s), the second power is not related to the second field of the given downlink signaling; the K is a positive integer, the K1 is a positive integer not greater than the K; the first index is a non-negative integer; the first radio signal comprises a first reference signal, the first index is used to determine an RS sequence corresponding to the first reference signal, the first reference signal is SRS; the unit of the first power is dBm.

7. The method according to claim 6, wherein the first coefficient is configured by higher layer signaling.

8. The method according to claim 6, wherein the third component is equal to a transmission power of a given reference signal minus a RSRP of the given reference signal;
or, the third component is associated with a target antenna virtualization vector, and the first index is used to determine the target antenna virtualization vector.

9. The method according to claim 6, wherein the third component is a path loss value estimated in dB by the UE in a serving cell with index c, the first radio signal being transmitted on the serving cell with index c.

10. The method according to claim 6, wherein the reference power is a highest transmit power threshold the UE configured in the i-th subframe of the serving cell with index c, and the first radio signal is transmitted on the serving cell with index c;
or, time domain resources occupied by any two of the K downlink signalings are orthogonal.

11. A user equipment (UE) for power adjustment, comprising:
a first processor, receiving K downlink signaling(s); and
a first transmitter, transmitting a first radio signal;
wherein any downlink signaling of the K downlink signaling(s) comprises a first field and a second field; the second field is a TPC, the second field of any downlink signaling of the K downlink signaling(s) is used to determine a power offset; a transmitting power of the first radio signal is a first power; K1 downlink signaling(s) exist(s) among the K downlink signaling(s); a value of the first field of each of the K1 downlink signaling(s) is equal to a first index; the first power is a smallest one of a second power and a reference power, and the second power is respectively linearly correlated with a first component, a second component, a third component, and a fifth component; the first component is related to a bandwidth occupied by the first radio signal; the second component is configured by a higher layer signaling; the third component is related to a channel quality between the User Equipment and a receiver of the first radio signal; the fifth component and a sum of the K1 power offset(s) is linearly related, and the linear coefficient between the fifth component and the sum of the K1 power offset(s) is 1; linear coefficients between the second power and the first component, the second component and the fifth component are 1 respectively, and a linear coefficient between the second power and the third component is a first coefficient, the first coefficient is a non-negative number less than or equal to one; the K1 power offset(s) is(are) respectively indicated by the second field(s) of the K1 downlink signaling(s); the K downlink signaling(s) schedules(schedule) a same carrier, the K downlink signaling(s) is(are) all transmitted on PDCCH; the first power is not related to the second field of a given downlink signaling, the given downlink signaling is any downlink signaling whose first field value is not equal to the first index among the K downlink signaling(s), the second power is not related to the second field of the given downlink signaling; the K is a positive integer, the K1 is a positive integer not greater than the K; the first index is a non-negative integer; the first radio signal comprises a first reference signal, the first index is used to determine an RS sequence corresponding to the first reference signal, the first reference signal is SRS; the unit of the first power is dBm.

12. The UE according to claim 11, wherein the first coefficient is configured by higher layer signaling.

13. The UE according to claim 11, wherein the third component is equal to a transmission power of a given reference signal minus a RSRP of the given reference signal;
or, the third component is associated with a target antenna virtualization vector, and the first index is used to determine the target antenna virtualization vector.

14. The UE according to claim 11, wherein the third component is a path loss value estimated in dB by the UE in a serving cell with index c, the first radio signal being transmitted on the serving cell with index c.

15. The method according to claim 11, wherein the reference power is a highest transmit power threshold the UE configured in the i-th subframe of the serving cell with index c, and the first radio signal is transmitted on the serving cell with index c;
or, time domain resources occupied by any two of the K downlink signalings are orthogonal.

16. A base station equipment for power adjustment, comprising:
a second processor, transmitting K downlink signaling(s); and
a first receiver, receiving a first radio signal;
wherein any downlink signaling of the K downlink signaling(s) comprises a first field and a second field; the second field is a TPC, the second field of any downlink signaling of the K downlink signaling(s) is used to determine a power offset; a transmitting power of the first radio signal is a first power; K1 downlink signaling(s) exist(s) among the K downlink signaling(s); a value of the first field of each of the K1 downlink signaling(s) is equal to a first index; the first power is a smallest one of a second power and a reference power, and the second power is respectively linearly correlated with a first component, a second component, a third component, and a fifth component; the first component is related to a bandwidth occupied by the first radio signal; the second component is configured by a higher layer signaling; the third component is related to a channel quality between a transmitter of the first radio signal and the base station; the fifth component and a sum of the K1 power offset(s) is linearly related, and the linear coefficient between the fifth component and the sum of the K1 power offset(s) is 1; linear coefficients between the second power and the first component, the second component and the fifth component are 1 respectively, and a linear coefficient between the second power and the third component is a first coefficient, the first coefficient is a non-negative number less than or equal to one; the K1 power offset(s) is(are) respectively indicated by the second field(s) of the K1 downlink signaling(s); the K downlink signaling(s) schedules(schedule) a same carrier, the K downlink signaling(s) is(are) all transmitted on PDCCH; the first power is not related to the second field of a given downlink signaling, the given downlink signaling is any downlink signaling whose first field value is not equal to the first index among the K downlink signaling(s), the second power is not related to the second field of the given downlink signaling; the K is a positive integer, the K1 is a positive integer not greater than the K; the first index is a non-negative integer; the first radio signal comprises a first reference signal, the first index is used to determine an RS sequence corresponding to the first reference signal, the first reference signal is SRS; the unit of the first power is dBm.

17. The base station according to claim 16, wherein the first coefficient is configured by higher layer signaling.

18. The base station according to claim 16, wherein the third component is equal to a transmission power of a given reference signal minus a RSRP of the given reference signal;
or, the third component is associated with a target antenna virtualization vector, and the first index is used to determine the target antenna virtualization vector.

19. The base station according to claim 16, wherein the third component is a path loss value estimated in dB by the UE in a serving cell with index c, the first radio signal being transmitted on the serving cell with index c.

20. The method according to claim 16, wherein the reference power is a highest transmit power threshold the UE configured in the i-th subframe of the serving cell with index c, and the first radio signal is transmitted on the serving cell with index c;
or, time domain resources occupied by any two of the K downlink signalings are orthogonal.

* * * * *